United States Patent
Wallin et al.

(10) Patent No.: US 12,415,416 B2
(45) Date of Patent: Sep. 16, 2025

(54) MODULAR ELECTRONIC POWER TAKE-OFF UNIT FOR A REFUSE VEHICLE WITH HIGH VOLTAGE CONNECTION POINT

(71) Applicant: Oshkosh Corporation, Oshkosh, WI (US)

(72) Inventors: Jacob Wallin, Oshkosh, WI (US); Derek Wente, Austin, MN (US); Aaron Hardy, Oshkosh, WI (US); Thomas Vale, Oshkosh, WI (US); Vince Andrada, Oshkosh, WI (US); Quincy Wittman, Oshkosh, WI (US); Jason Rice, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

(21) Appl. No.: 18/609,697

(22) Filed: Mar. 19, 2024

(65) Prior Publication Data
US 2024/0317048 A1    Sep. 26, 2024

Related U.S. Application Data

(60) Provisional application No. 63/458,516, filed on Apr. 11, 2023, provisional application No. 63/453,270, filed on Mar. 20, 2023.

(51) Int. Cl.
| | |
|---|---|
| *B60K 17/28* | (2006.01) |
| *B60K 1/04* | (2019.01) |
| *B60L 1/00* | (2006.01) |
| *B60L 15/00* | (2006.01) |
| *B65F 3/02* | (2006.01) |
| *F15B 15/18* | (2006.01) |
| *H01M 50/204* | (2021.01) |
| *H01M 50/249* | (2021.01) |
| *H01M 10/0525* | (2010.01) |

(52) U.S. Cl.
CPC .............. *B60K 17/28* (2013.01); *B60K 1/04* (2013.01); *B60L 1/003* (2013.01); *B60L 15/007* (2013.01); *B65F 3/02* (2013.01); *F15B 15/18* (2013.01); *H01M 50/204* (2021.01); *H01M 50/249* (2021.01); *B65F 2003/0269* (2013.01); *B65F 2003/0279* (2013.01); *H01M 10/0525* (2013.01); *H01M 2220/20* (2013.01)

(58) Field of Classification Search
CPC ....... B60K 17/28; B60K 1/04; H01M 50/249; H01M 50/204; H01M 10/0525; H01M 2220/20; B60L 1/003; B60L 15/007; B65F 3/02; B65F 2003/0279; F15B 15/18
See application file for complete search history.

(56) References Cited

U.S. PATENT DOCUMENTS

| | | | | |
|---|---|---|---|---|
| 11,148,880 B1 * | 10/2021 | Koga | ................. | B60R 25/01 |
| 11,161,415 B1 * | 11/2021 | Koga | ................. | B65F 3/02 |
| 11,254,498 B1 * | 2/2022 | Koga | ................. | B65F 3/02 |

(Continued)

*Primary Examiner* — Toan C To
(74) *Attorney, Agent, or Firm* — Foley & Lardner LLP

(57) ABSTRACT

A modular electric power take-off (E-PTO) system for a refuse vehicle includes a modular housing. The modular E-PTO also includes a motor, an inverter, a battery, and a hydraulic pump positioned within the modular housing. The modular housing is removably coupled with a front of a waste receptacle or a hopper of the waste receptacle of a refuse vehicle.

20 Claims, 16 Drawing Sheets

(56) References Cited

U.S. PATENT DOCUMENTS

| | | | |
|---|---|---|---|
| 11,630,201 B2* | 4/2023 | Koga | G01S 13/867 |
| | | | 701/25 |
| 11,674,534 B2* | 6/2023 | Wente | F15B 11/161 |
| | | | 414/406 |
| 12,007,793 B2* | 6/2024 | Koga | G05D 1/646 |
| 12,130,122 B1* | 10/2024 | Smith | H01M 50/209 |
| 12,162,679 B2* | 12/2024 | Koga | B65F 3/06 |
| 12,226,662 B2* | 2/2025 | Koga | B65F 3/041 |
| 12,231,824 B2* | 2/2025 | Koga | H04N 7/18 |
| 2014/0277931 A1* | 9/2014 | Crowe | B60L 58/31 |
| | | | 701/36 |
| 2019/0193934 A1* | 6/2019 | Rocholl | B65F 3/041 |
| 2020/0346547 A1 | 11/2020 | Rocholl et al. | |
| 2020/0346556 A1 | 11/2020 | Rocholl et al. | |
| 2020/0346557 A1 | 11/2020 | Rocholl et al. | |
| 2020/0346854 A1 | 11/2020 | Rocholl et al. | |
| 2020/0346855 A1 | 11/2020 | Rocholl et al. | |
| 2020/0346856 A1 | 11/2020 | Rocholl et al. | |
| 2020/0346857 A1 | 11/2020 | Rocholl et al. | |
| 2020/0346858 A1 | 11/2020 | Buege et al. | |
| 2020/0346859 A1 | 11/2020 | Buege et al. | |
| 2020/0346860 A1 | 11/2020 | Buege et al. | |
| 2020/0346861 A1 | 11/2020 | Rocholl et al. | |
| 2020/0346862 A1 | 11/2020 | Rocholl et al. | |
| 2020/0347659 A1 | 11/2020 | Rocholl et al. | |
| 2020/0347661 A1 | 11/2020 | Rocholl et al. | |
| 2020/0347857 A1 | 11/2020 | Clifton et al. | |
| 2020/0398670 A1 | 12/2020 | Rocholl et al. | |
| 2020/0398695 A1 | 12/2020 | Rocholl et al. | |
| 2020/0398697 A1 | 12/2020 | Rocholl et al. | |
| 2020/0399057 A1 | 12/2020 | Rocholl et al. | |
| 2021/0031611 A1 | 2/2021 | Yakes et al. | |
| 2021/0031612 A1 | 2/2021 | Yakes et al. | |
| 2021/0221216 A1 | 7/2021 | Yakes et al. | |
| 2021/0229908 A1 | 7/2021 | Rocholl et al. | |
| 2021/0252995 A1 | 8/2021 | Rocholl et al. | |
| 2021/0323436 A1 | 10/2021 | Rocholl et al. | |
| 2021/0323437 A1 | 10/2021 | Rocholl et al. | |
| 2021/0323438 A1 | 10/2021 | Rocholl et al. | |
| 2021/0323763 A1 | 10/2021 | Koga et al. | |
| 2021/0323764 A1 | 10/2021 | Koga et al. | |
| 2021/0323765 A1 | 10/2021 | Koga et al. | |
| 2021/0324880 A1 | 10/2021 | Wente et al. | |
| 2021/0325529 A1 | 10/2021 | Koga et al. | |
| 2021/0325911 A1 | 10/2021 | Koga et al. | |
| 2021/0326550 A1 | 10/2021 | Kappers et al. | |
| 2021/0327164 A1 | 10/2021 | Koga et al. | |
| 2021/0339632 A1 | 11/2021 | Rocholl et al. | |
| 2021/0339648 A1 | 11/2021 | Koga et al. | |
| 2021/0345062 A1 | 11/2021 | Koga et al. | |
| 2021/0373560 A1 | 12/2021 | Koga et al. | |
| 2021/0396251 A1 | 12/2021 | Clifton et al. | |
| 2022/0009338 A1 | 1/2022 | Yakes et al. | |
| 2022/0033181 A1 | 2/2022 | Koga et al. | |
| 2022/0096884 A1 | 3/2022 | Koga et al. | |
| 2022/0097527 A1 | 3/2022 | Koga et al. | |
| 2022/0097555 A1 | 3/2022 | Koga et al. | |
| 2022/0097556 A1 | 3/2022 | Koga et al. | |
| 2022/0097633 A1 | 3/2022 | Koga et al. | |
| 2022/0097961 A1 | 3/2022 | Koga et al. | |
| 2022/0097962 A1 | 3/2022 | Koga et al. | |
| 2022/0097963 A1 | 3/2022 | Koga et al. | |
| 2022/0097964 A1 | 3/2022 | Koga et al. | |
| 2022/0099723 A1 | 3/2022 | Koga et al. | |
| 2022/0105827 A1 | 4/2022 | Rocholl et al. | |
| 2022/0106114 A1 | 4/2022 | Buege et al. | |
| 2022/0106115 A1 | 4/2022 | Buege et al. | |
| 2022/0118854 A1* | 4/2022 | Davis | B60W 10/08 |
| 2022/0156474 A1 | 5/2022 | Kappers et al. | |
| 2022/0161854 A1 | 5/2022 | Mortenson et al. | |
| 2022/0161997 A1 | 5/2022 | Mortenson et al. | |
| 2022/0169444 A1 | 6/2022 | Rocholl et al. | |
| 2022/0185582 A1 | 6/2022 | Koga et al. | |
| 2022/0219896 A1 | 7/2022 | Gary et al. | |
| 2022/0258965 A1 | 8/2022 | Kappers et al. | |
| 2022/0258967 A1 | 8/2022 | Kappers et al. | |
| 2022/0267090 A1 | 8/2022 | Rocholl et al. | |
| 2022/0307312 A1 | 9/2022 | Rocholl et al. | |
| 2022/0340359 A1 | 10/2022 | Rocholl et al. | |
| 2022/0380123 A1 | 12/2022 | Buege et al. | |
| 2023/0002152 A1 | 1/2023 | Koga et al. | |
| 2023/0039772 A1 | 2/2023 | Rocholl et al. | |
| 2023/0039974 A1 | 2/2023 | Rocholl et al. | |
| 2023/0042649 A1 | 2/2023 | Koga et al. | |
| 2023/0045720 A1 | 2/2023 | Rocholl et al. | |
| 2023/0047275 A1 | 2/2023 | Rocholl et al. | |
| 2023/0053238 A1 | 2/2023 | Koga et al. | |
| 2023/0089417 A1 | 3/2023 | Koga et al. | |
| 2023/0117427 A1 | 4/2023 | Turner et al. | |
| 2023/0120042 A1* | 4/2023 | Turner | G10K 11/17823 |
| | | | 381/71.1 |
| 2023/0125077 A1 | 4/2023 | Gary et al. | |
| 2023/0173945 A1 | 6/2023 | Rocholl et al. | |
| 2023/0184934 A1 | 6/2023 | Koga et al. | |
| 2023/0202301 A1 | 6/2023 | Rocholl et al. | |
| 2023/0202340 A1 | 6/2023 | Koga et al. | |
| 2023/0241960 A1 | 8/2023 | Yakes et al. | |
| 2023/0242337 A1 | 8/2023 | Rocholl et al. | |
| 2023/0243371 A1 | 8/2023 | Clifton et al. | |
| 2023/0265866 A1 | 8/2023 | Wente et al. | |
| 2023/0278786 A1 | 9/2023 | Rocholl et al. | |
| 2023/0286741 A1 | 9/2023 | Buege et al. | |
| 2023/0287715 A1 | 9/2023 | Kappers et al. | |
| 2023/0294493 A1 | 9/2023 | Rocholl et al. | |
| 2023/0294915 A1 | 9/2023 | Koga et al. | |
| 2023/0303321 A1 | 9/2023 | Koga et al. | |
| 2023/0356934 A1 | 11/2023 | Wente et al. | |
| 2023/0356935 A1 | 11/2023 | Gary et al. | |
| 2023/0356937 A1 | 11/2023 | Wente et al. | |
| 2023/0356938 A1 | 11/2023 | Kappers et al. | |
| 2023/0356939 A1* | 11/2023 | Wente | B65F 3/02 |
| 2023/0356940 A1 | 11/2023 | Codega et al. | |
| 2023/0356941 A1 | 11/2023 | Wente et al. | |
| 2023/0356942 A1 | 11/2023 | Koga et al. | |
| 2023/0382640 A1 | 11/2023 | Buege et al. | |
| 2023/0407695 A1 | 12/2023 | Rocholl et al. | |
| 2024/0001764 A1 | 1/2024 | Koga et al. | |
| 2024/0001798 A1 | 1/2024 | Rocholl et al. | |
| 2024/0017640 A1 | 1/2024 | Koga et al. | |
| 2024/0075815 A1 | 3/2024 | Koga et al. | |
| 2024/0083294 A1 | 3/2024 | Rocholl et al. | |
| 2024/0111290 A1 | 4/2024 | Koga et al. | |
| 2024/0116705 A1 | 4/2024 | Koga et al. | |
| 2024/0116706 A1 | 4/2024 | Rocholl et al. | |
| 2024/0124224 A1 | 4/2024 | Schimke et al. | |
| 2024/0124225 A1 | 4/2024 | Schad et al. | |
| 2024/0131728 A1 | 4/2024 | Buege et al. | |
| 2024/0161552 A1 | 5/2024 | Koga et al. | |
| 2024/0166434 A1 | 5/2024 | Rocholl et al. | |
| 2024/0190649 A1 | 6/2024 | Mortenson et al. | |

* cited by examiner

MODULAR ELECTRONIC POWER TAKE-OFF UNIT FOR A REFUSE VEHICLE WITH HIGH VOLTAGE CONNECTION POINT

CROSS-REFERENCE TO RELATED PATENT APPLICATIONS

This application claims the benefit of and priority to U.S. Provisional Application No. 63/453,270, filed Mar. 20, 2023, and U.S. Provisional Application No. 63/458,516, filed Apr. 11, 2023, the entire disclosures both of which are incorporated by reference herein.

BACKGROUND

Electric refuse vehicles (i.e., battery-powered refuse vehicles) include one or more energy storage elements (e.g., batteries) that supply energy to an electric motor. The electric motor supplies rotational power to the wheels of the refuse vehicle to drive the refuse vehicle. The energy storage elements can also be used to supply energy to vehicle subsystems, like the lift system or the compactor.

SUMMARY

One implementation of the present disclosure is a refuse vehicle, according to an exemplary embodiment. The refuse vehicle includes a chassis, a chassis battery, a vehicle body, and a modular electric power take-off ("E-PTO") system. The chassis supports multiple tractive elements. The chassis battery is supported by the chassis and is configured to provide electrical power to a first motor. Rotation of the first motor selectively drives at least one of the tractive elements. The vehicle body is supported by the chassis and defines a receptacle for storing refuse therein. The modular E-PTO system includes multiple components positioned within a modular housing that is removably coupled with the vehicle body. The components of the modular E-PTO system include a motor, an inverter, a battery, and a hydraulic pump. High voltage ("HV") components of the modular E-PTO system are electrically accessible to be electrically coupled with a HV electrical system of the refuse vehicle at a single connection point provided at a junction plate of the modular E-PTO system or at a junction box.

In some embodiments, the modular E-PTO system is removably coupled with a front of the receptacle or a hopper of the receptacle. In some embodiments, the modular E-PTO system is fastened to a pair of brackets on a front of the hopper of the receptacle. The pair of brackets protrude from a front wall of the hopper at opposite lateral ends of the hopper.

In some embodiments, the motor of the modular E-PTO system is configured to consume electrical energy from the battery through the inverter and drive the hydraulic pump to provide pressurized hydraulic fluid to one or more hydraulic systems of the refuse vehicle to perform an operation. In some embodiments, the modular E-PTO system is configured to be removed from the refuse vehicle as a unit by electrically de-coupling the HV components of the modular E-PTO system from the HV electrical system of the refuse vehicle at the single connection point, de-coupling one or more hydraulic lines, and removing the modular housing.

In some embodiments, the modular housing is proximate a cabin of the refuse vehicle, the cabin positioned forwards of the receptacle. In some embodiments, the refuse vehicle further includes a switch electrically coupled with the single connection point. The switch is transitionable between an on position such that the HV components of the modular E-PTO system exchange energy with the HV electrical system of the refuse vehicle, and an off position such that the HV components of the modular E-PTO system are limited from exchanging energy with the HV electrical system of the refuse vehicle for removal or installation of the modular E-PTO system.

In some embodiments, the junction plate is coupled with and defines part of a sidewall of the modular housing. In some embodiments, the junction box is positioned within the modular housing and includes a pair of connectors on different sides of the junction box and a pair of cables forming a 90 degree turn within the junction box and electrically coupling the pair of connectors on the different sides of the junction box.

Another implementation of the present disclosure is a modular electric power take-off (E-PTO) system for a refuse vehicle, according to an exemplary embodiment. The modular E-PTO system includes a modular housing. The modular E-PTO also includes a motor, an inverter, a battery, and a hydraulic pump positioned within the modular housing. The modular housing is removably coupled with a front of a waste receptacle or a hopper of the waste receptacle of a refuse vehicle.

In some embodiments, high voltage ("HV") components of the modular E-PTO system are electrically accessible to be electrically coupled with a HV electrical system of the refuse vehicle at a single connection point provided at a junction plate of the modular E-PTO system or at a junction box. In some embodiments, the modular E-PTO system is configured to be removed from the refuse vehicle as a unit by electrically de-coupling the HV components of the modular E-PTO system from the HV electrical system of the refuse vehicle at the single connection point, de-coupling one or more hydraulic lines, and removing the modular housing.

In some embodiments, the modular E-PTO system includes a switch electrically coupled with the single connection point. The switch is transitionable between an on position such that the HV components of the modular E-PTO system exchange energy with the HV electrical system of the refuse vehicle, and an off position such that the HV components of the modular E-PTO system are limited from exchanging energy with the HV electrical system of the refuse vehicle for removal or installation of the modular E-PTO system.

In some embodiments, the modular housing is fastened to a pair of brackets on a front of the hopper of the waste receptacle. The pair of brackets protrude from a front wall of the hopper at opposite lateral ends of the hopper.

In some embodiments, the motor of the modular E-PTO system is configured to consume electrical energy from the battery through the inverter and drive the hydraulic pump to provide pressurized hydraulic fluid to one or more hydraulic systems of the refuse vehicle to perform an operation. In some embodiments, the modular housing is proximate a cabin of the refuse vehicle, the cabin positioned forwards of the waste receptacle.

In some embodiments, the junction plate is coupled with and defines part of a sidewall of the modular housing. In some embodiments, the junction box is positioned within the modular housing and includes a pair of connectors on different sides of the junction box and a pair of cables forming a 90 degree turn within the junction box and electrically coupling the pair of connectors on the different sides of the junction box.

Another implementation of the present disclosure is a refuse vehicle, according to an exemplary embodiment. The refuse vehicle includes a chassis, a chassis battery, a vehicle body, and a modular tailgate. The chassis is coupled with wheels. The chassis battery is supported by the chassis and configured to provide electrical power to a first motor. Rotation of the first motor selectively drives at least one of the wheels. The vehicle body is supported by the chassis and defines a receptacle for storing refuse therein. The modular tailgate assembly includes a tailgate pivotally coupled with the vehicle body, and multiple electric actuators. High voltage ("HV") components of the modular tailgate assembly are electrically accessible to be electrically coupled with a HV electrical system of the refuse vehicle at a single connection point provided at a junction plate of the modular tailgate assembly or at a junction box.

In some embodiments, the modular tailgate assembly is electrically de-couplable at the single connection point from the HV electrical system of the refuse vehicle for physical removal of the modular tailgate assembly from the vehicle body.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Figure 1:
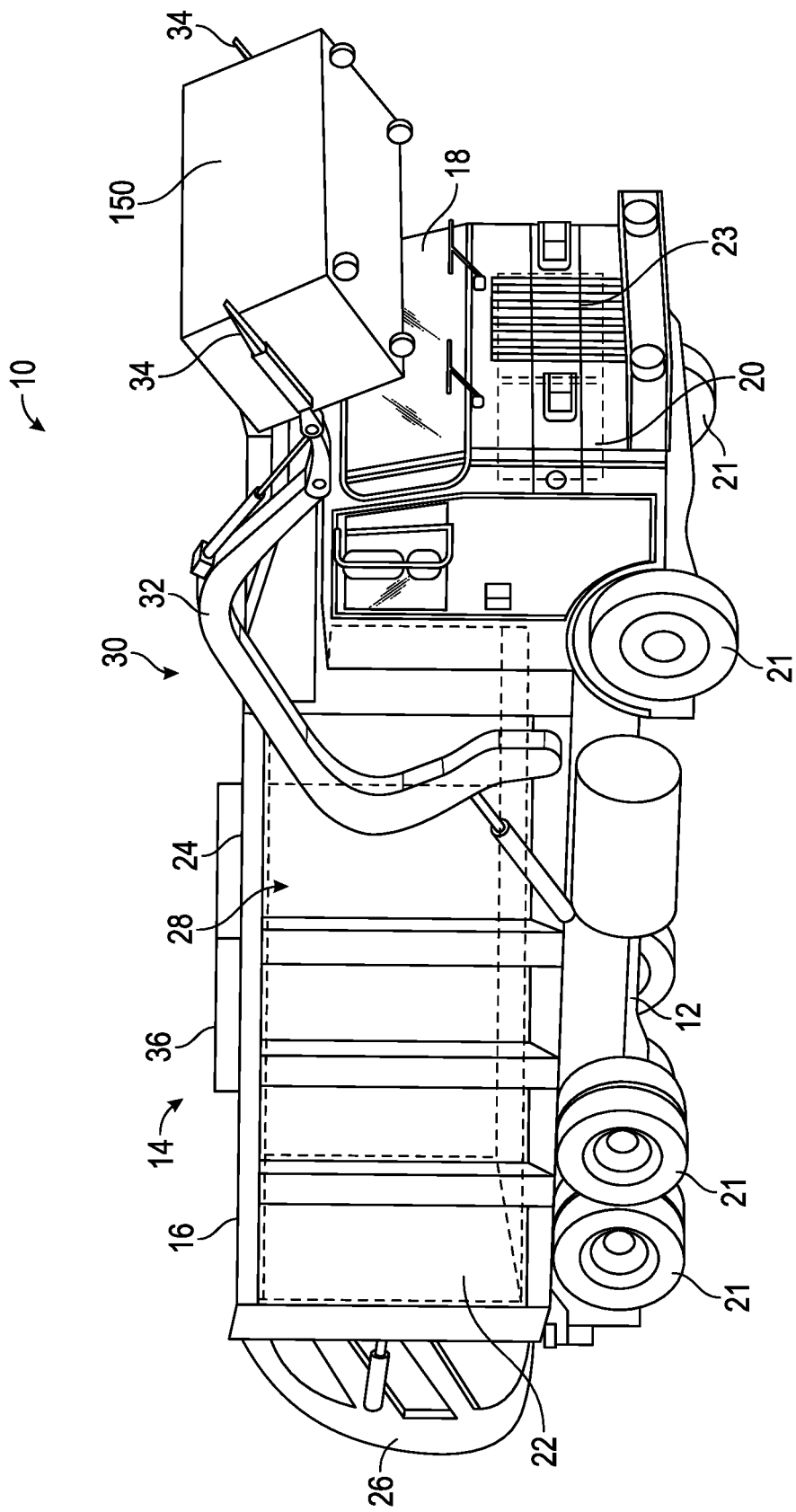
FIG. 1 is a perspective view of a front loading refuse vehicle according to an exemplary embodiment.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Overview

Referring to the FIGURES generally, the various exemplary embodiments disclosed herein relate to electric refuse vehicles. Electric refuse vehicles, or E-refuse vehicles, include an onboard energy storage device, like a battery, that provides power to a motor that produces rotational power to drive the vehicle. The energy storage device, which is commonly a battery, can be used to provide power to different subsystems on the E-refuse vehicle. The energy storage device is also configured to provide hydraulic power to different subsystems on the E-refuse vehicle through an electric power take-off (E-PTO) system. Generally, power take-off (PTO) mechanisms are included on refuse vehicles to convert energy from a power source, such as an engine, to other systems on the truck, such as a hydraulic lifting system. However, here, the E-PTO system receives electrical power from the energy storage device and provides the electrical power to an electric motor. The electric motor drives a hydraulic pump that provides pressurized hydraulic fluid to different vehicle subsystems, including the compactor and the lifting system.

The E-PTO system may be positioned within a modular housing that is removably coupled onto a body assembly of a refuse vehicle. The E-PTO system may be fastened at a front end of the body assembly of the refuse vehicle and can define a compartment or enclosure within which the components of the E-PTO system can be positioned (e.g., batteries, an electric motor, an inverter, a hydraulic pump, etc.). In some embodiments, the E-PTO system is removable from the body assembly of the refuse vehicle (e.g., for servicing) and swappable or replaceable with a second modular E-PTO system that is structurally the same or similar. In this way, a shop or servicing location may include multiple modular E-PTO systems which can quickly be swapped onto refuse vehicles to reduce fleet downtime and improve efficiency of a refuse vehicle fleet.

The E-PTO system may also include a junction box or a junction plate to provide a single location where high voltage (HV) components of the E-PTO system can be electrically coupled with HV components or a HV system of the body of the vehicle (e.g., a battery system). Advantageously, providing the junction box or the junction plate that is accessible from an exterior of the modular housing reduces a need or requirement for a technician to remove housing panels when the E-PTO is installed on the vehicle.

While embodiments of the E-PTO system and modular housing are described herein with reference to electric refuse vehicles, it should be appreciated that the modular housing designs may also be used on hybrid powered and/or non-electric refuse vehicles to house electronic and/or hydraulic components of the refuse vehicle, which can facilitate servicing and reduce downtime.

Electric Refuse Vehicle

Referring to FIGS. 1-4, a vehicle, shown as refuse vehicle 10, also referred to as a refuse vehicle 10 throughout the application, (e.g., garbage truck, waste collection truck, sanitation truck, etc.), includes a chassis, shown as a frame 12, and a body assembly, shown as body 14, coupled to the frame 12. The body assembly 14 defines an on-board receptacle 16 and a cab 18. The cab 18 is coupled to a front end of the frame 12, and includes various components to facilitate operation of the refuse vehicle 10 by an operator (e.g., a seat, a steering wheel, hydraulic controls, etc.) as well as components that can execute commands automatically to control different subsystems within the vehicle (e.g., computers, controllers, processing units, etc.). The refuse vehicle 10 further includes a prime mover 20 coupled to the frame 12 at a position beneath the cab 18. The prime mover 20 provides power to a plurality of motive members, shown as wheels 21, and to other systems of the vehicle (e.g., a pneumatic system, a hydraulic system, etc.). In one embodiment, the prime mover 20 is one or more electric motors coupled to the frame 12. The electric motors may consume electrical power from an on-board energy storage device (e.g., batteries 23, ultra-capacitors, etc.), from an on-board generator (e.g., an internal combustion engine), or from an external power source (e.g., overhead power lines) and provide power to the systems of the refuse vehicle 10.

Figure 2:
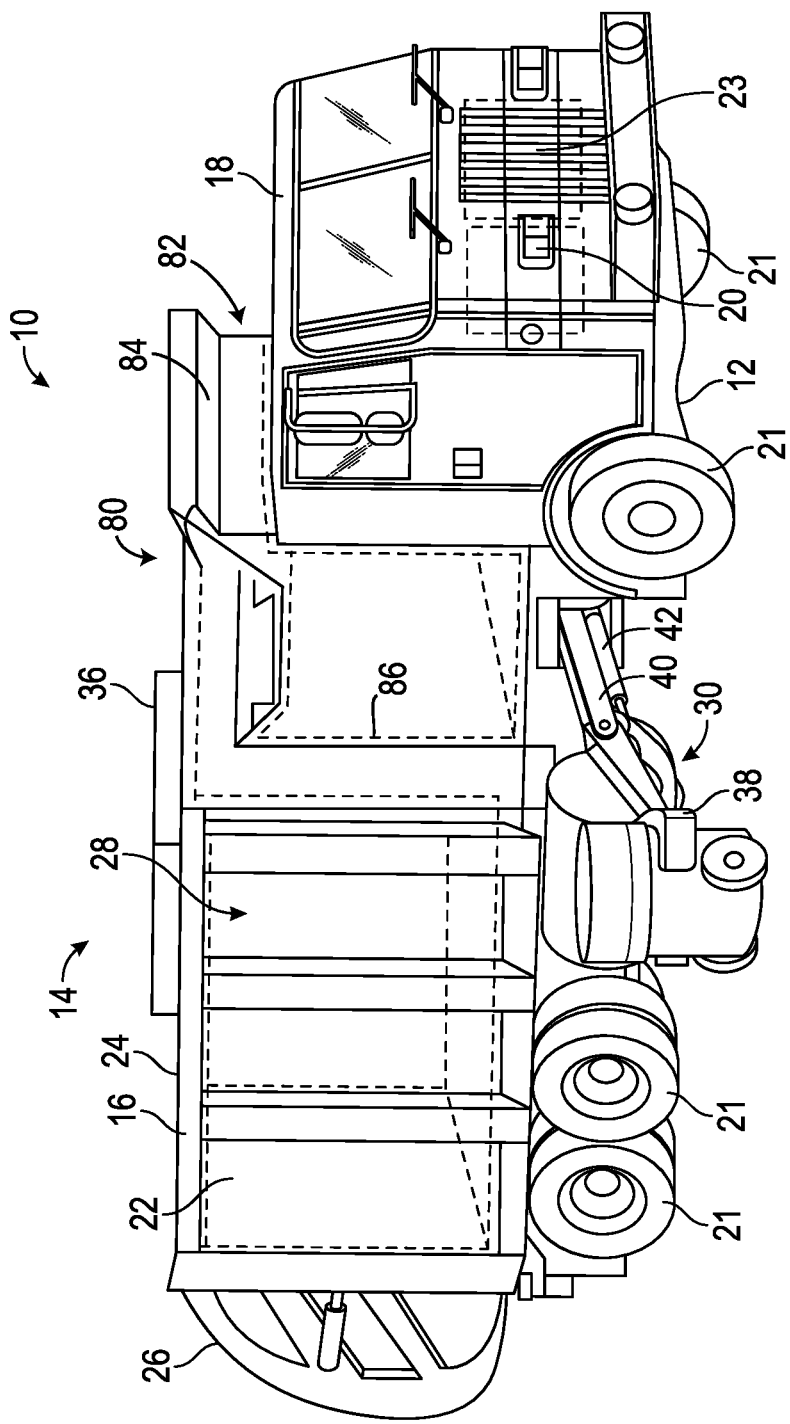
FIG. 2 is a perspective view of a side loading refuse vehicle according to an exemplary embodiment.
Figure 3:
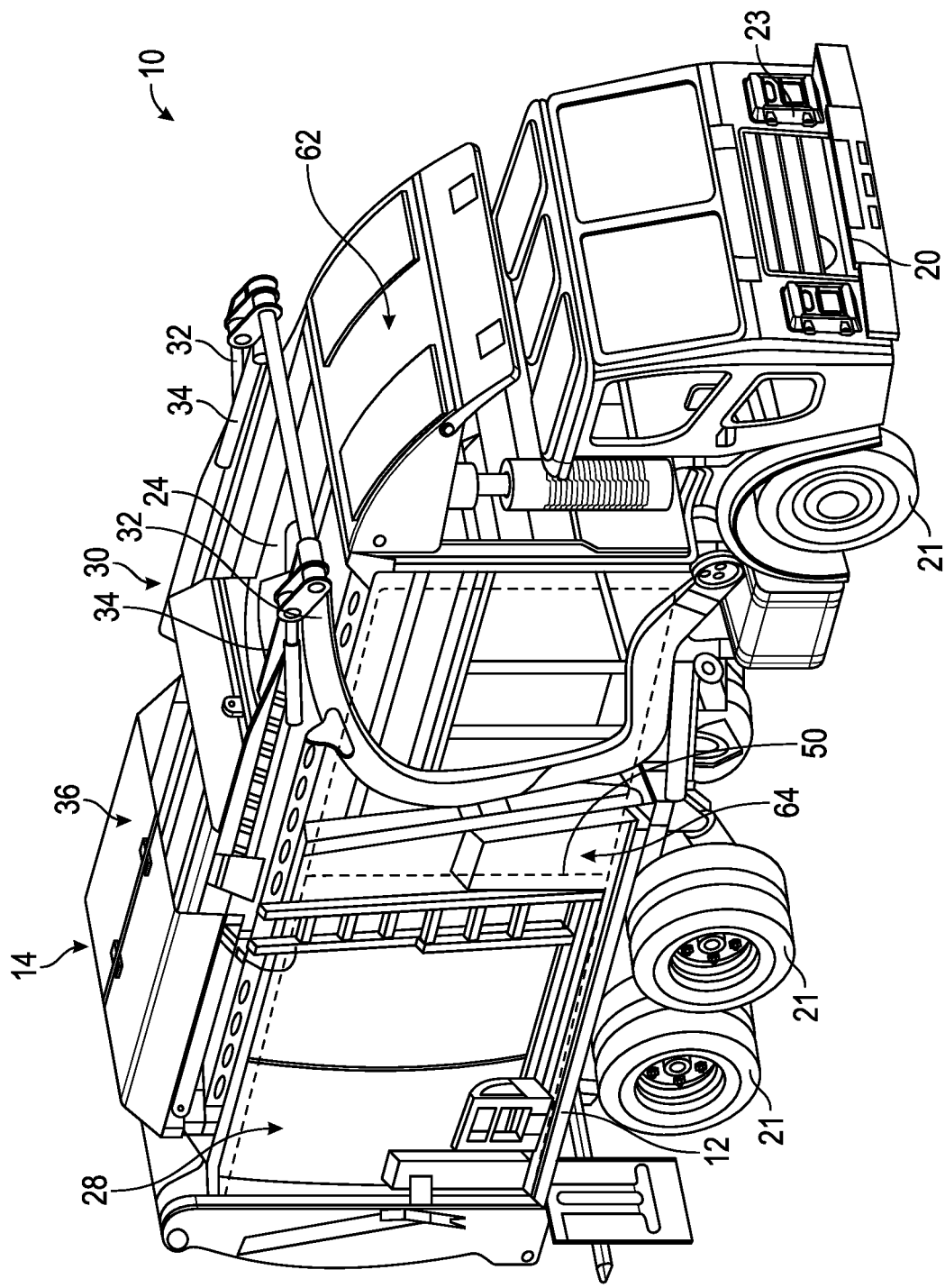
FIG. 3 is a front perspective view of an electric front loading refuse vehicle according to an exemplary embodiment.

According to an exemplary embodiment, the refuse vehicle 10 is configured to transport refuse from various waste receptacles within a municipality to a storage or processing facility (e.g., a landfill, an incineration facility, a recycling facility, etc.). As shown in FIGS. 1-3, the body 14 and on-board receptacle 16, in particular, include a series of panels, shown as panels 22, a cover 24, and a tailgate 26. The panels 22, cover 24, and tailgate 26 define a collection chamber 28 of the on-board receptacle 16. Loose refuse is placed into the collection chamber 28, where it may be thereafter compacted. The collection chamber 28 provides temporary storage for refuse during transport to a waste disposal site or a recycling facility, for example. In some embodiments, at least a portion of the on-board receptacle 16 and collection chamber 28 extend over or in front of the cab 18. According to the embodiment shown in FIGS. 1-4, the on-board receptacle 16 and collection chamber 28 are each positioned behind the cab 18. In some embodiments, the collection chamber 28 includes a hopper volume 86 and a storage volume. Refuse is initially loaded into the hopper volume 86 and thereafter compacted into the storage volume. According to an exemplary embodiment, the hopper volume 86 is positioned between the storage volume and the cab 18 (i.e., refuse is loaded into a position behind the cab 18 and stored in a position further toward the rear of the refuse vehicle 10).

Referring again to the exemplary embodiment shown in FIG. 1, the refuse vehicle 10 is a front-loading refuse vehicle. As shown in FIG. 1, the refuse vehicle 10 includes a lifting system 30 that includes a pair of arms 32 coupled to the frame 12 on either side of the cab 18. The arms 32 may be rotatably coupled to the frame 12 with a pivot (e.g., a lug, a shaft, etc.). In some embodiments, actuators (e.g., hydraulic cylinders, etc.) are coupled to the frame 12 and the arms 32, and extension of the actuators rotates the arms 32 about an axis extending through the pivot. According to an exemplary embodiment, interface members, shown as forks 34, are coupled to the arms 32. The forks 34 have a generally rectangular cross-sectional shape and are configured to engage a refuse container (e.g., protrude through apertures within the refuse container, etc.). During operation of the refuse vehicle 10, the forks 34 are positioned to engage the refuse container (e.g., the refuse vehicle 10 is driven into position until the forks 34 protrude through the apertures within the refuse container). As shown in FIG. 1, the arms 32 are rotated to lift the refuse container over the cab 18. A second actuator (e.g., a hydraulic cylinder articulates the forks 34 to tip the refuse out of the container and into the hopper volume 86 of the collection chamber 28 through an opening in the cover 24. The actuator thereafter rotates the arms 32 to return the empty refuse container to the ground. According to an exemplary embodiment, a top door 36 is slid along the cover 24 to seal the opening thereby preventing refuse from escaping the collection chamber 28 (e.g., due to wind, etc.).

Referring to the exemplary embodiment shown in FIG. 2, the refuse vehicle 10 is a side-loading refuse vehicle that includes a lifting system, shown as a grabber 38 that is configured to interface with (e.g., engage, wrap around, etc.) a refuse container (e.g., a residential garbage can, etc.). According to the exemplary embodiment shown in FIG. 2, the grabber 38 is movably coupled to the body 14 with an arm 40. The arm 40 includes a first end coupled to the body 14 and a second end coupled to the grabber 38. An actuator (e.g., a hydraulic cylinder 42) articulates the arm 40 and positions the grabber 38 to interface with the refuse container. The arm 40 may be movable within one or more directions (e.g., up and down, left and right, in and out, rotation, etc.) to facilitate positioning the grabber 38 to interface with the refuse container. According to an alternative embodiment, the grabber 38 is movably coupled to the body 14 with a track. After interfacing with the refuse container, the grabber 38 is lifted up the track (e.g., with a cable, with a hydraulic cylinder, with a rotational actuator, etc.). The track may include a curved portion at an upper portion of the body 14 so that the grabber 38 and the refuse container are tipped toward the hopper volume 86 of the collection chamber 28. In either embodiment, the grabber 38 and the refuse container are tipped toward the hopper volume 86 of the collection chamber 28 (e.g., with an actuator, etc.). As the grabber 38 is tipped, refuse falls through an opening in the cover 24 and into the hopper volume 86 of the collection chamber 28. The arm 40 or the track then returns the empty refuse container to the ground, and the top door 36 may be slid along the cover 24 to seal the opening thereby preventing refuse from escaping the collection chamber 28 (e.g., due to wind).

Figure 4:
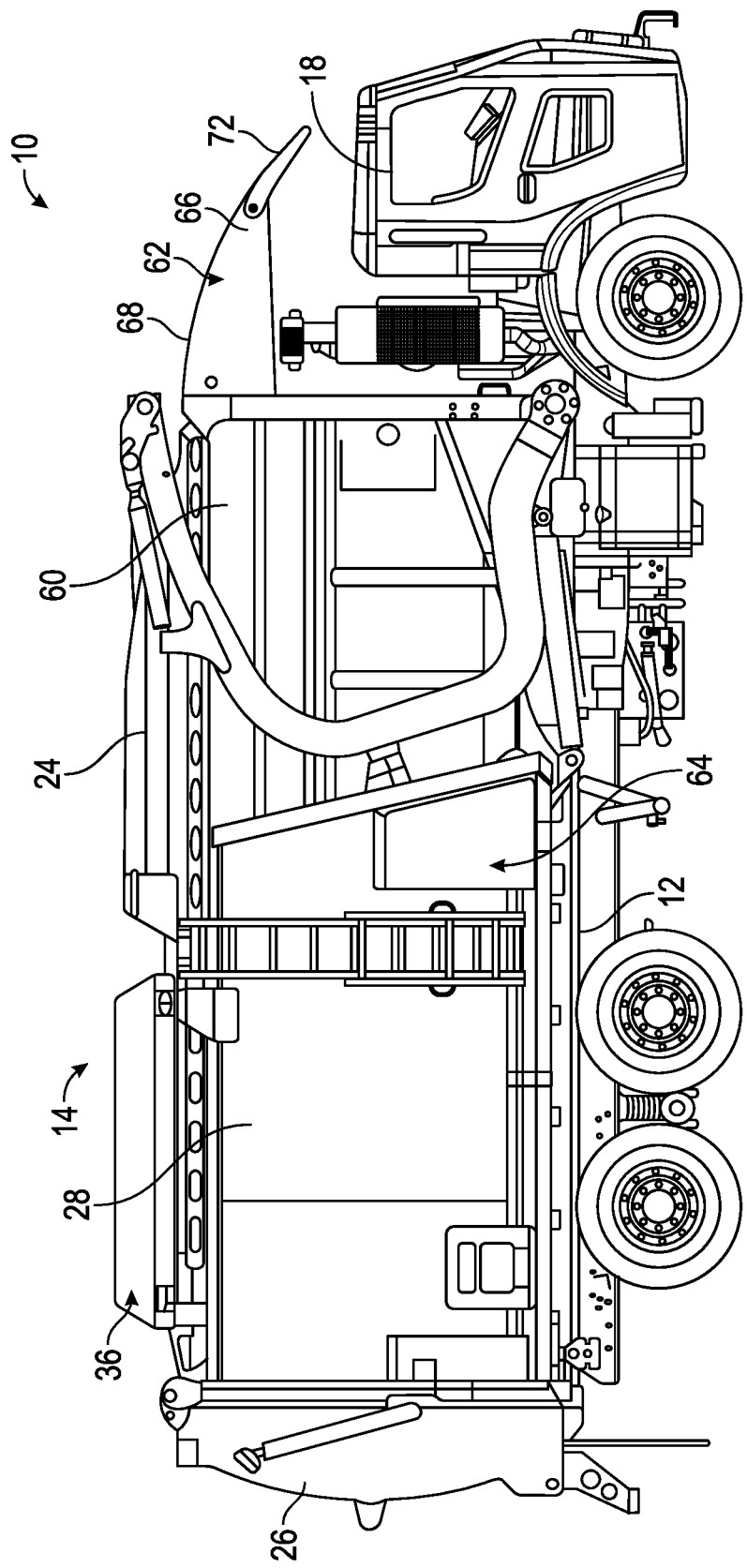
FIG. 4 is a right side view of the electric front loading refuse vehicle of FIG. 3.

Referring to FIGS. 3-4, the refuse vehicle 10 is a front loading electric refuse vehicle 10 (i.e., an E-refuse vehicle). Like the refuse vehicle 10 shown in FIG. 1, the E-refuse vehicle includes a lifting system 30 that includes a pair of arms 32 coupled to the frame 12 on either side of the cab 18. The arms 32 are rotatably coupled to the frame 12 with a pivot (e.g., a lug, a shaft, etc.). In some embodiments, actuators (e.g., hydraulic cylinders, etc.) are coupled to the frame 12 and the arms 32, and extension of the actuators rotates the arms 32 about an axis extending through the pivot. According to an exemplary embodiment, interface members, shown as forks 34, are coupled to the arms 32. The forks 34 have a generally rectangular cross-sectional shape and are configured to engage a refuse container (e.g., protrude through apertures within the refuse container, etc.). During operation of the refuse vehicle 10, the forks 34 are positioned to engage the refuse container (e.g., the refuse vehicle 10 is driven into position until the forks 34 protrude through the apertures within the refuse container). A second actuator (e.g., a hydraulic cylinder) articulates the forks 34 to tip the refuse out of the container and into the hopper volume 86 of the collection chamber 28 through an opening in the cover 24. The actuator thereafter rotates the arms 32 to return the empty refuse container to the ground. According to an exemplary embodiment, a top door 36 is slid along the cover 24 to seal the opening thereby preventing refuse from escaping the collection chamber 28 (e.g., due to wind, etc.).

Still referring to FIGS. 3-4, the refuse vehicle 10 includes one or more energy storage devices, shown as batteries 23. The batteries 23 can be rechargeable lithium-ion batteries, for example. The batteries 23 are configured to supply electrical power to the prime mover 20, which includes one or more electric motors. The electric motors are coupled to the wheels 21 through a vehicle transmission, such that rotation of the electric motor (e.g., rotation of a drive shaft of the motor) rotates a transmission shaft, which in turn rotates the wheels 21 of the vehicle. The batteries 23 can supply additional subsystems on the refuse vehicle 10, including additional electric motors, cab controls (e.g., climate controls, steering, lights, etc.), the lifting system 30, and/or the compactor 50, for example.

Electric Power Take-Off

Figure 5:
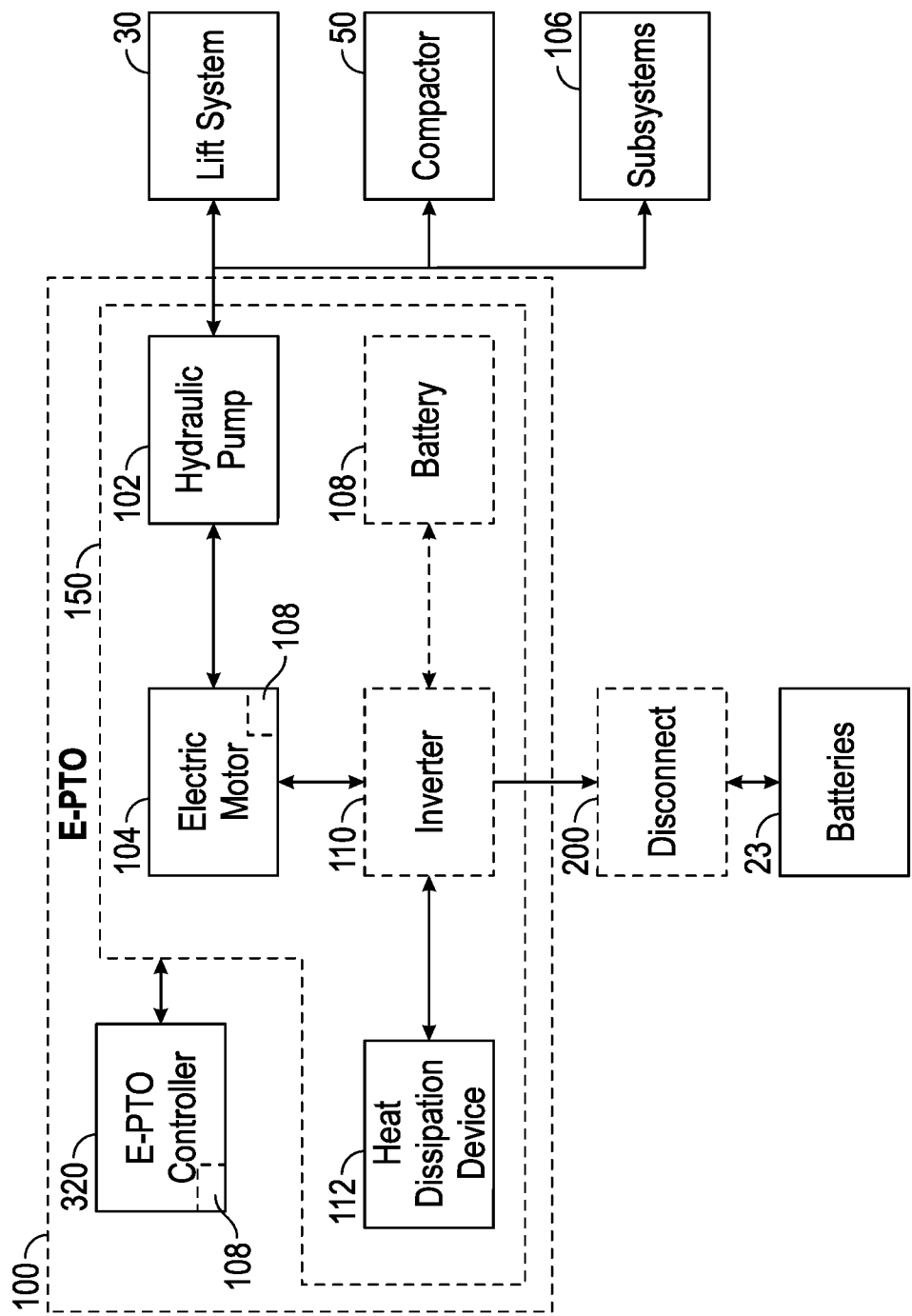
FIG. 5 is a schematic view of a control system of the refuse vehicle of FIG. 3.

The refuse vehicle 10 can be considered a hybrid refuse vehicle as it includes both electric and hydraulic power systems. As depicted in FIGS. 3-5, the refuse vehicle 10 includes an E-PTO system 100. The E-PTO system 100 is configured to receive electrical power from the batteries 23 and convert the electrical power to hydraulic power that can be used to power various other systems on the refuse vehicle 10. According to various embodiments, the E-PTO system 100 is self-contained within on the body of the refuse vehicle 10. For example, the E-PTO system 100 may be contained within a protective container (e.g., a fire resistant container) positioned on the refuse vehicle 10. The E-PTO system 100 includes an E-PTO sub-system 150 that includes various components of the E-PTO system 100, as will be discussed further herein. The E-PTO system 100 includes an E-PTO controller 320 configured to control and monitor (i.e., by receiving data from sensors) the components of the E-PTO sub-system 150 and various components of the refuse vehicle 10 as will be discussed in greater detail with reference to FIGS. 6 and 7. The E-PTO controller 320 may include a secondary battery such that the E-PTO controller 320 may operate independently of the battery 23. In some examples, the E-PTO system 100 includes an electric motor 104 driving a hydraulic pump 102. The hydraulic pump 102 pressurized hydraulic fluid onboard the refuse vehicle 10, which can then be supplied to various hydraulic cylinders and actuators present on the refuse vehicle 10. For example, the hydraulic pump 102 can provide pressurized hydraulic fluid to each of the hydraulic cylinders within the lift system 30 on the refuse vehicle. Additionally or alternatively, the hydraulic pump 102 can provide pressurized hydraulic fluid to a hydraulic cylinder controlling the compactor 50. In still further embodiments, the hydraulic pump 102 provides pressurized hydraulic fluid to the hydraulic cylinders that control a position and orientation of the tailgate 26. The E-PTO system 100 may operate independently of operation of the prime mover 20. For example, the E-PTO system 100 may operate while the prime mover 20 does not operate to transport the vehicle 10. The E-PTO system 100 may be similar to the independent accessory system as described in greater detail in U.S. patent application Ser. No. 17/007,605, filed Aug. 31, 2020, granted as U.S. Pat. No. 11,001,135 on May 11, 2021, the entire disclosure of which is incorporated by reference herein.

With continued reference to FIG. 5, the refuse vehicle 10 may include a disconnect 200 positioned between the batteries 23 and the E-PTO system 100. The disconnect 200 provides selective electrical communication between the batteries 23 and the E-PTO system 100 that can allow the secondary vehicle systems (e.g., the lift system, compactor, etc.) to be decoupled and de-energized from the electrical power source. For example, the E-PTO controller 320 may cause the disconnect 200 to be decoupled and de-energized from the electrical power source. The disconnect 200 can create an open circuit between the batteries 23 and the E-PTO system 100, such that no electricity is supplied from the batteries 23 to the electric motor 104 or the inverter 110 that is coupled to the electric motor 104 to convert DC power from the batteries 23 to AC power for use in the electric motor 104. Without electrical power from the batteries 23, the electric motor 104 will not drive the hydraulic pump 102. Pressure within the hydraulic system will gradually decrease, such that none of the lifting system 30, compactor 50, or vehicle subsystems 106 relying upon hydraulic power will be functional. The refuse vehicle 10 can then be operated in a lower power consumption mode, given the reduced electrical load required from the batteries 23 to operate the refuse vehicle 10. The disconnect 200 further enables the refuse vehicle 10 to conserve energy when the vehicle subsystems are not needed, and can also be used to lock out the various vehicle subsystems to perform maintenance activities.

The disconnect 200 further allows an all-electric vehicle chassis to be retrofit with hydraulic power systems, which can be advantageous for a variety of reasons, as hydraulic power systems may be more responsive and durable than fully electric systems. In some examples, the E-PTO system 100 includes a dedicated secondary battery 108 that is configured to supply electrical power to the E-PTO system 100 if the disconnect 200 is tripped, such that the secondary vehicle systems can remain optional even when the E-PTO system 100 is not receiving electrical power from the batteries 23. In some examples, the E-PTO system 100 operates independently of the battery 23, and includes its own dedicated secondary battery 108 that supplies DC electrical power to the inverter 110, which converts the DC electrical power to AC electrical power that can then be supplied to the electric motor 104. In still further embodiments, the dedicated secondary battery 108 is directly coupled to the electric motor 104 and supplies DC electrical power directly to the electric motor 104. With the secondary battery 108 present within the E-PTO system 100, the E-PTO system can be agnostic to the chassis type, and can be incorporated into all-electric, hybrid, diesel, CNG, or other suitable chassis types.

In certain embodiments, a heat dissipation device 112 is coupled to the inverter 110. The heat dissipation device 112 (e.g., a radiator, fan, etc.) is configured to draw heat away from the inverter 110 to reduce the risk of overheating. In certain embodiments, the heat dissipation device 112 is coupled to the inverter 110 via conduits. The conduits may be configured to transport a cooling fluid to and from the inverter 110. For example, the heat dissipation device may include a fluid pump configured to pump cooling fluid through the conduits. In certain embodiments, sensors may be positioned within or adjacent to the conduits. For example, the sensors may be configured to determine the flow rate of the cooling fluid through the conduits and/or the temperature of the cooling fluid flowing through the conduits, as will be discussed further below. It should be appreciated that the heat dissipation device 112 may also be coupled to various other components of the refuse vehicle 10.

Figure 6:
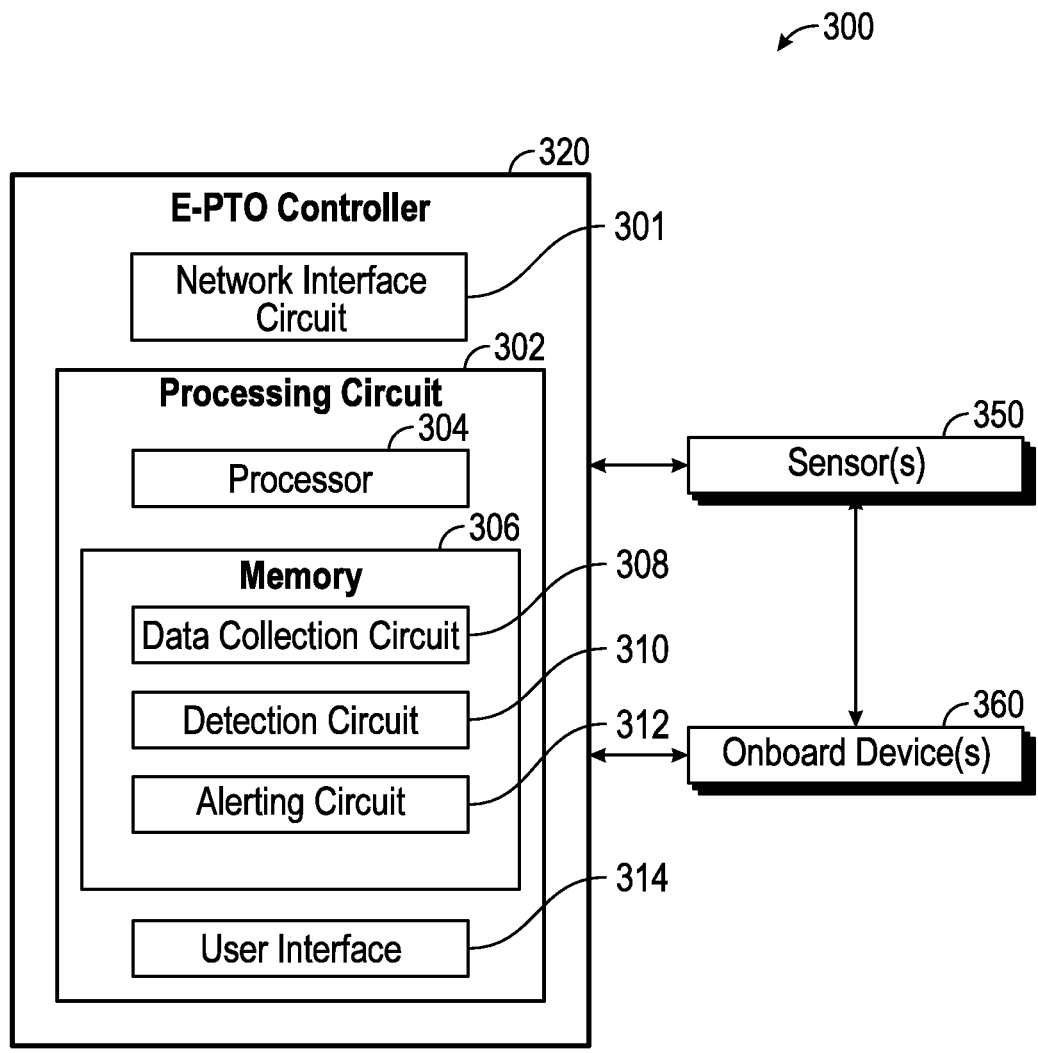
FIG. 6 is a schematic view of an E-PTO controller system according to an exemplary embodiment.
Figure 7:
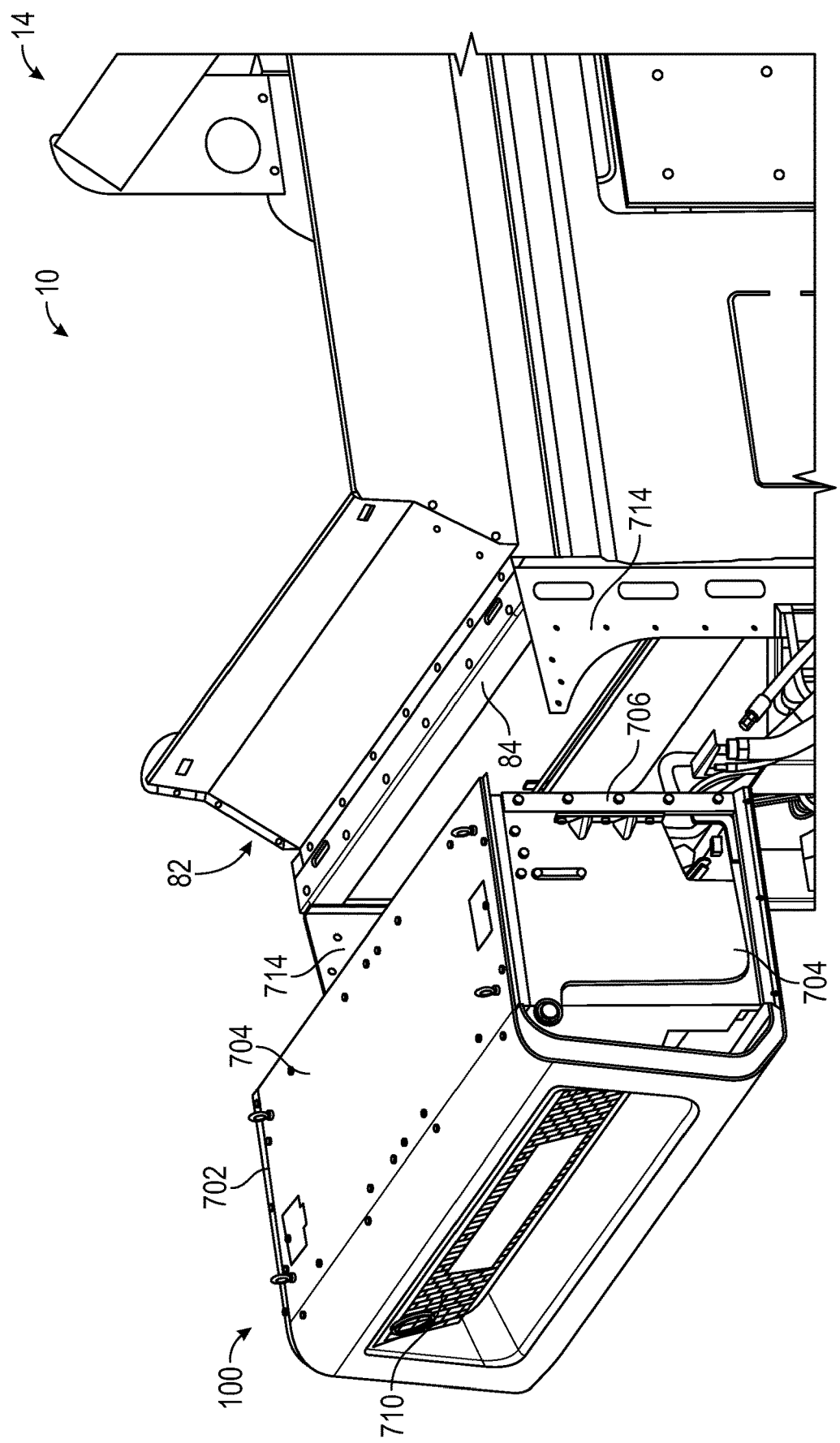
FIG. 7 is a perspective view of a modular E-PTO system for a refuse vehicle, according to an exemplary embodiment.

Referring now to FIG. 6, an E-PTO controller system 300 is shown according to an example embodiment. For example, the E-PTO controller system may be implemented and used by the refuse vehicle 10. The E-PTO controller system 300 includes an E-PTO controller 320 (i.e., the E-PTO controller 320 from FIG. 5). The E-PTO controller system 300 may include one or more sensor(s) 350 configured to record data associated with various onboard device(s) 360. The sensor(s) 350 may include any type of sensor that may record data corresponding to the onboard device(s) 360, including a heat sensor (e.g., a thermocouple), a thermal vision camera, a thermometer, an electric current sensor, pressure sensors, fuel level sensors, flow rate sensors, voltage detectors, noise meters, air pollution sensors, mass flow rate sensors, etc. and any combination thereof. The onboard device(s) includes any equipment that is a part of the refuse vehicle 10, including the batteries 23, the tailgate 26, the lifting system 30, the top door 36, the grabber 38, the hydraulic cylinder 42, the compactor 50, the E-PTO system 100, the hydraulic pump 102, the electric motor 104, the dedicated secondary battery 108, the inverter 110, the heat dissipation device 112, the subsystems 106, E-PTO controller 320, and all sub components thereof.

In certain embodiments, each sensor 350 is configured to record data related to one or more onboard devices 360. For example, one or more a thermal sensors 350 may detect and record the temperature of the heat dissipation device 112 and/or the inverter 110. Further, one or more sensors 350 may be within or adjacent to the conduits that connects the heat dissipation device 112 to the inverter 110. In this example, the sensors 350, may determine the temperature (e.g., thermocouples, resistance temperature detectors, thermistors, semiconductor based on integrated circuits, etc.) and/or the fluid flow rate (e.g., a Coriolis meter, a differential pressure meter, a magnetic meter, a multiphase meter, a turbine meter, an ultrasonic meter, a vortex meter, a positive displacement meter, an electromagnetic flow meter, etc.) of the cooling fluid in the conduits. In certain embodiments, more than one sensor 350 is used to record data related to a single onboard device 360. For example, a thermal sensor 350 may detect and record the temperature of the inverter 110 and an electric flow sensor 350 may be used to record the current going into and/or out of the inverter 110.

In various embodiments, the E-PTO controller 320 is communicably coupled to sensor(s) 350, such that the data recorded by the sensor(s) 350 may be saved and analyzed. The E-PTO controller 320 is also communicably coupled to the onboard device(s) 360 such that the E-PTO controller 320 may control the onboard device(s) 360 (e.g., by sending operating parameters to the onboard devices). In certain embodiments, the E-PTO controller 320 includes a network interface circuit 301 configured to enable the E-PTO controller 320 to exchange information over a network. The network interface circuit 301 can include program logic that facilitates connection of the E-PTO controller 320 to the network (e.g., a cellular network, Wi-Fi, Bluetooth, radio, etc.). The network interface circuit 301 can support communications between the E-PTO controller 320 and other systems, such as a remote monitoring computing system. For example, the network interface circuit 301 can include a cellular modem, a Bluetooth transceiver, a radio-frequency identification (RFID) transceiver, and a near-field communication (NFC) transmitter. In some embodiments, the network interface circuit 301 includes the hardware and machine-readable media sufficient to support communication over multiple channels of data communication.

The E-PTO controller 320 is shown to include a processing circuit 302 and a user interface 314. The processing circuit 302 may include a processor 304 and a memory 306. The processor 304 may be coupled to the memory 306. The processor 304 may be a general purpose or specific purpose processor, an application specific integrated circuit (ASIC), one or more field programmable gate arrays (FPGAs), a group of processing components, or other suitable processing components. The processor 304 is configured to execute computer code or instructions stored in the memory 306 or received from other computer readable media (e.g., CDROM, network storage, a remote server, etc.).

The memory 306 may include one or more devices (e.g., memory units, memory devices, storage devices, etc.) for storing data and/or computer code for completing and/or facilitating the various processes described in the present disclosure. The memory 306 may include random access memory (RAM), read-only memory (ROM), hard drive storage, temporary storage, non-volatile memory, flash memory, optical memory, or any other suitable memory for storing software objects and/or computer instructions. The memory 306 may include database components, object code components, script components, or any other type of information structure for supporting the various activities and information structures described in the present disclosure. The memory 306 may be communicably connected to the processor 304 via processing circuit 302 and may include computer code for executing (e.g., by the processor 304) one or more of the processes described herein.

The data collection circuit 308 is configured to collect and store data collected by the sensor(s) 350. For example, the data collection circuit 308 may collect data during operation of the refuse vehicle 10, and store the data. Further, the collection circuit 308 is configured to store operating parameters that the E-PTO controller 320 may provide to onboard devices 360 to control the onboard devices 360. For example, the E-PTO controller 320 may provide operating parameters to the heat dissipation device 112 such that the E-PTO controller 320 may control the cooling fluid flow rate through the conduits. The operating parameters, for example, may be used to control the fluid pump within the heat dissipation device 112. For example, the operating parameters may increase or decrease the pumping rate of the fluid pump, thereby increasing or decreasing the flow rate of cooling fluid through the conduits. The data collection circuit 308 may also store normal operating conditions corresponding to each sensor 350. For example, the normal operating conditions may include a range of values measured by each sensor 350 that indicates an onboard device 360 is operating properly. For example, if initial operating parameters are provided to an onboard device 360, the normal operating conditions may be the expected senor 350 reading taken with respect to that onboard device 360. Further, the data collection circuit 308 is configured to store threshold measurements for each sensor 350. Each sensor 350 may have a different threshold measurement. In certain embodiments, the threshold measurement may represent both an upper threshold measurement (i.e., the upper bound) and a lower threshold measurement (i.e., a lower bound), such that a sensor 350 measurement below the lower bound or above the upper bound may be indicative of a critical event. The threshold measurement may represent a maximum (i.e., upper bound) and/or minimum acceptable (i.e., lower bound) value that may be detected by a sensor 350. The threshold measurement may depended on each onboard device's 360 demands (i.e., the onboard device 360 that the sensor 350 is monitoring). For example, a sensor 350 may be used to measure the cooling fluid temperature exiting the heat dissipation device 112. A predetermined threshold measurement may be defined for the sensor 350 and if the sensor 350 measures a reading above that threshold measurement, the E-PTO controller 320 may detect a critical operation. For example, the predetermined threshold measurement for the sensor 350 may represent the maximum acceptable temperature that the cooling fluid may safely reach without risking damage to the inverter 110 or the heat dissipation device 112. In another example, a sensor 350 may be used to measure the flow rate of the cooling fluid through the inverter 110. The threshold measurement for the sensor 350 may correspond with the minimum acceptable flow rate of the cooling fluid. For example, if the flow rate dropped below the threshold measurement, the inverter 110 or heat dissipation device 112 may be damaged.

The detection circuit 310 is configured to receive signals from sensor(s) 350 and compare this data to the data stored by the data collection circuit 308. For example, the detection circuit 310 may be able to identify if various components in a system (e.g., the E-PTO system 100, the lifting system 30, the compactor 50, subsystems 106, etc.) is in compliance (i.e., operating within the normal operating condition bounds). The detection circuit 322 is also configured to determine if a sensor 350 reading exceeds the threshold measurement. For example, detection circuit 310 may determine the presence of a critical operating condition if a sensor 350 detects the temperature of the inverter 110, or a region thereof, exceeds a predetermined threshold temperature. In some embodiments, detection circuit 310 detects a location of a critical operating condition. For example, detection circuit 310 may determine a critical operating condition is occurring in the inverter 110 because a sensor 350 detecting a temperature over the threshold temperature located proximate the inverter 110. In some embodiments, if the detection circuit 310 detects a critical operating condition, the critical operating condition, and the circumstances surrounding it, is communicated to the alerting circuit 312.

Alerting circuit 312 is configured to perform one or more operations in response to receiving an indication of a critical operating condition. In some embodiments, alerting circuit 312 presents an indication of the critical operating condition to an operator of refuse vehicle 10. For example, alerting circuit 312 may control a user interface 314 to display a warning to an operator of refuse vehicle 10.

The user interface 314 is configured to present information to and receive information from a user. In some embodiments, user interface 314 includes a display device (e.g., a monitor, a touchscreen, hud, etc.). In some embodiments, user interface 314 includes an audio device (e.g., a microphone, a speaker, etc.). In various embodiments, user interface 314 receives alerts from alerting circuit 312 and presents the alerts to an operator of refuse vehicle 10. For example, user interface 314 may receive a visual alert from alerting circuit 312 and display a graphic on a display device to alert an operator of refuse vehicle 10 of a critical operating condition and the location of the critical operating condition associated with the refuse vehicle 10.

In some embodiments, alerting circuit 312 operates refuse vehicle 10. For example, alerting circuit 312 may cause the E-PTO system 100 to shut down in response to a critical operating condition being detected with respect to a component of the E-PTO system 100. For example, if the cooling fluid flow rate through the inverter 110 is sensed (i.e., by a sensor 350) to be below a threshold measurement (i.e., as determined by the detection circuit 310), the alerting circuit 312 may cause the entire E-PTO system 100 to be shut down. Further, the alerting circuit 312 may cause the entire refuse vehicle 10 to shut down in response receiving an indication of a critical operating condition. Additionally or alternatively, alerting circuit 312 may transmit one or more notifications. For example, alerting circuit 213 may transmit a notification to the network interface circuit 301, such that a notification may be sent via the network to a fleet monitoring system that monitors the status of various refuse vehicles 10.

Modular Electric Power Take-Off

Referring to FIGS. 7-11, the E-PTO system 100 or the various components thereof may be physically provided on the refuse vehicle 10 in a modular housing 702 (e.g., a pod, a body, a capsule, a physically detachable assembly, an integral unit, a kit, etc.), according to some embodiments. The modular housing 702 may include one or more panels 704 (e.g., housing members, planar surfaces, plates, etc.) and one or more structural members 706 (e.g., support members, bars, beams, rails, etc.) onto which the panels 704 are coupled (e.g., fastened, attached, welded, etc.).

The panels 704 may define an inner volume 708 (e.g., a space, an area, a zone, a compartment, etc.) within which one or more of the components of the E-PTO system 100 are positioned. In some embodiments, the E-PTO sub-system 150 components are positioned within the inner volume 708. In some embodiments, the E-PTO controller 320 and the secondary battery 108 are positioned within the inner volume 708 of the modular housing 702. The modular housing 702 may include one or more sidewalls, that form or include a grating 710 (e.g., a mesh, an array of openings, multiple holes, etc.) to facilitate heat dissipation out of the modular housing 702 (e.g., heat that is generated by the battery 108). The grating 710 may be positioned in a direction of travel of the refuse vehicle 10 such that movement of the refuse vehicle 10 induces the transportation of air into the inner volume 708 of the modular housing 702 to thereby provide cooling for components of the E-PTO system 100. In some embodiments, the grating 710 is positioned directly in front of a radiator of the E-PTO system 100 (e.g., the heat dissipation device 112).

Referring still to FIGS. 7-11, the modular housing 702 may be coupled to a front wall or front portion 84 (e.g., a head board, a head frame, etc.) of a front end 82 of the body assembly 14. In some embodiments, the modular housing 702 is fastened onto the front portion 84 and removable from the front portion 84. The modular housing 702 may be positioned proximate (e.g., above) the cab 18. In some embodiments, the modular housing 702 is positioned on top of the body assembly 14 (e.g., above an upper surface, subflush with the upper surface of the body assembly 14). In some embodiments, the modular housing 702 is positioned at a rear end of the body assembly 14. The modular housing 702 can include one or more openings 712 so that one or more tubular members (e.g. hoses, hydraulic lines, etc.) and one or more cables (e.g., electrical cables, energy carrying cables, communications wires, etc.) can be coupled or connected to the corresponding components within the modular housing 702 (e.g., to electrically and/or hydraulically couple the compartment to the chassis 12 and/or other components of the refuse vehicle 10). For example, the cables may include high voltage (HV) and low voltage (LV)

cables that electrically couple the inverter 110 with the batteries 23 or with a controller of the vehicle 10. In some embodiments, the modular housing 702 is also configured to receive a hydraulic hose through the opening 712 so that the various hydraulic components of the vehicle 10 (e.g., the lift system 30, the compactor 50, the subsystems 106, etc.) may be hydraulically coupled with the hydraulic pump 102 that is positioned within the modular housing 702. The opening 712 may be an elongated slot disposed on a lower wall of the modular housing 702 facing toward the chassis 12 of the refuse vehicle 10 or another location along the modular housing 702. In some embodiments, the connection points for the cables (e.g., the electrical cables) and the hydraulic lines are in proximity to each other at the modular housing 702 such that the cables and hydraulic lines can easily be connected or disconnected from a single position when installing or removing the modular housing 702. In some embodiments, the cables include a disconnect (e.g., a plug) at a position between the modular housing 702 and the body assembly 14 or chassis 12 of the refuse vehicle 10, such as proximate to the opening 712 of the modular housing 702.

Referring still to FIGS. 7-11, the modular housing 702 may be coupled with the body assembly 14 (e.g., at the front portion 84) via one or more connection members 714 that extend from the front portion 84. The connection members 714 (e.g., plates, planar surfaces, structural members, engagement members, etc.) may define one or more surfaces at opposite lateral ends of the body assembly 14. In some embodiments, the modular housing 702 may be positioned between the connection members 714 and fastened to the connection members 714 via bolts or another suitable fastener. In some embodiments, the modular housing 702 is configured to interlock with corresponding portions of the body assembly 14 or the connection members 714. For example, the modular housing 702 may include at least one quick disconnect such as clips, slotted openings (that support the modular housing 702 by its own weight on the chassis 12), quick release pins, and/or another type of quick disconnect to simplify removal of the modular housing from the chassis 12.

In some embodiments, the modular housing 702 is disposed on rails that extend from the body assembly 14 (e.g., the connection members 714 include rails) and the modular housing 702 rests upon the rails. In some embodiments, the modular housing 702 is disposed in a drawer assembly and includes quick connects/disconnects for the electric cables and the hydraulic lines. In some embodiments, the body assembly 14 includes a pan or a shelf that extends outwards from the body assembly 14 (e.g., at the front end 82 of the body assembly 14, at a rear end of the body assembly 14, on top of the body assembly 14, from lateral sides of the body assembly 14, etc.) and the modular housing 702 rests upon and is interlocked or fastened to the pan or the shelf. In still other embodiments, the modular housing 702 may be positioned on the chassis 12, between frame rails of the chassis 12, hung from the chassis 12, positioned on a shelf that extends laterally from sides of the chassis 12, etc. In some embodiments, the modular housing 702 is positioned within an inner volume of the body assembly 14, on the tailgate 26, above the tailgate 26, below the tailgate 26, beneath the cab 18, etc.

Figure 12:
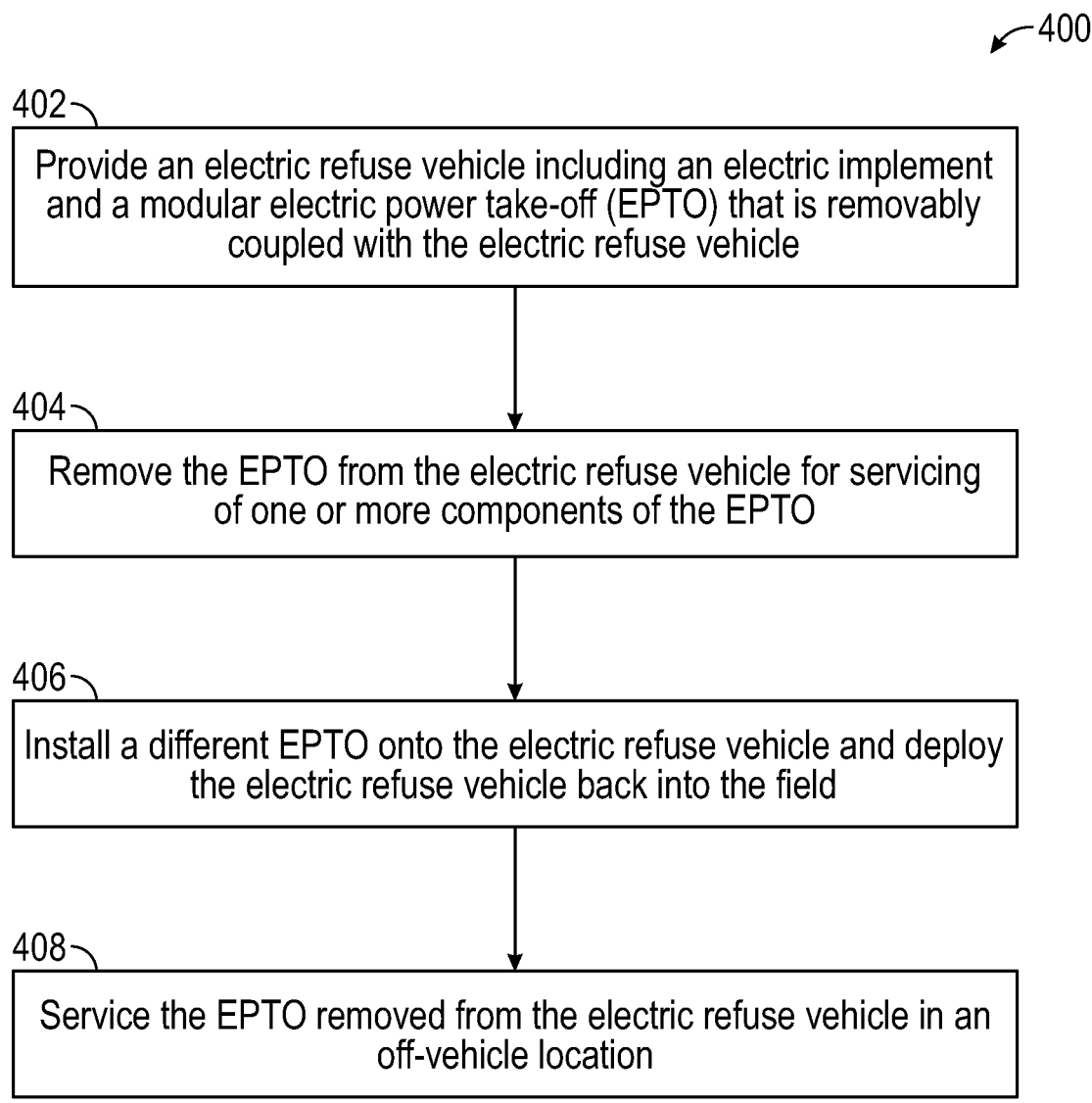
FIG. 12 is a flow diagram of a process for servicing and deploying a refuse vehicle including the modular E-PTO system of FIG. 7, according to an exemplary embodiment.

Referring to FIG. 12, a process 400 for servicing an electric refuse vehicle that includes a modular E-PTO includes steps 402-408. The modular housing 702 as described above with reference to FIGS. 7-11 facilitates removal and off-truck servicing of a first E-PTO or other electric and/or hydraulic components contained within a first modular housing 702 which may be immediately replaced with a second modular housing 702 containing a second E-PTO (a properly functioning E-PTO and/or other components) to reduce downtime of the vehicle 10.

The process 400 includes providing an electric refuse vehicle including an electric implement and a modular electric power take-off (E-PTO) that is removably coupled with the electric refuse vehicle (step 402), according to some embodiments. In some embodiments, the electric refuse vehicle is the refuse vehicle 10 and the modular E-PTO is the E-PTO system 100 disposed within the modular housing 702. The modular E-PTO may be fastened or otherwise removably coupled with a body assembly of the electric refuse vehicle.

The process 400 includes removing the first modular housing and E-PTO from the electric refuse vehicle for servicing of one or more components of the E-PTO (step 404), according to some embodiments. In some embodiments, step 404 is performed by removing or uninstalling one or more fasteners that physically couple the first modular housing of the first E-PTO to the body assembly of the electric refuse vehicle. In some embodiments, step 404 includes disconnecting one or more hydraulic lines and one or more electrical cables that hydraulically and electrically couple components of the first E-PTO with corresponding components of the body assembly or the electric refuse vehicle.

The process 400 includes installing a different E-PTO (a second E-PTO) and/or other electronic and/or hydraulic component onto the electric refuse vehicle and deploying the electric refuse vehicle back into the field (step 406), according to some embodiments. In some embodiments, step 406 is performed by fastening the second modular housing, containing a different or new E-PTO (e.g., structurally similar to or the same as the E-PTO that is removed in step 402 but is fully functional or fully charged), into place on the body assembly where the first modular housing of step 404 was removed from. In some embodiments, step 406 includes connecting one or more hydraulic lines and one or more electrical cables of the body assembly or the electric refuse vehicle to one or more corresponding components of the different E-PTO that are positioned within the modular housing of the different E-PTO.

The process 400 includes servicing the first E-PTO removed from the electric refuse vehicle (e.g., removed in step 404) in an off-vehicle location (step 408), according to some embodiments. In some embodiments, step 408 can be performed to service or charge the first E-PTO that is removed in step 404 while the electric refuse vehicle is deployed back into the field to reduce downtime of the electric refuse vehicle. Once the E-PTO is serviced or fully charged, the first E-PTO may be replaced back onto the electric refuse vehicle or may be installed onto a different electric refuse vehicle. In this way, the E-PTO can be removed and swapped with a similar E-PTO that is also modular to facilitate reduction of downtime of electric refuse vehicles. Further, various steps of the process 400 may be performed by different technicians. For example, a first technician that is trained to remove and install the modular housing and E-PTO systems (e.g., having a first skill level) may perform steps 404 and 406, while a second technician that is trained to perform more advanced servicing operations of various components within the modular housing (such as the E-PTO) may perform step 408.

Junction Box

Figure 8:
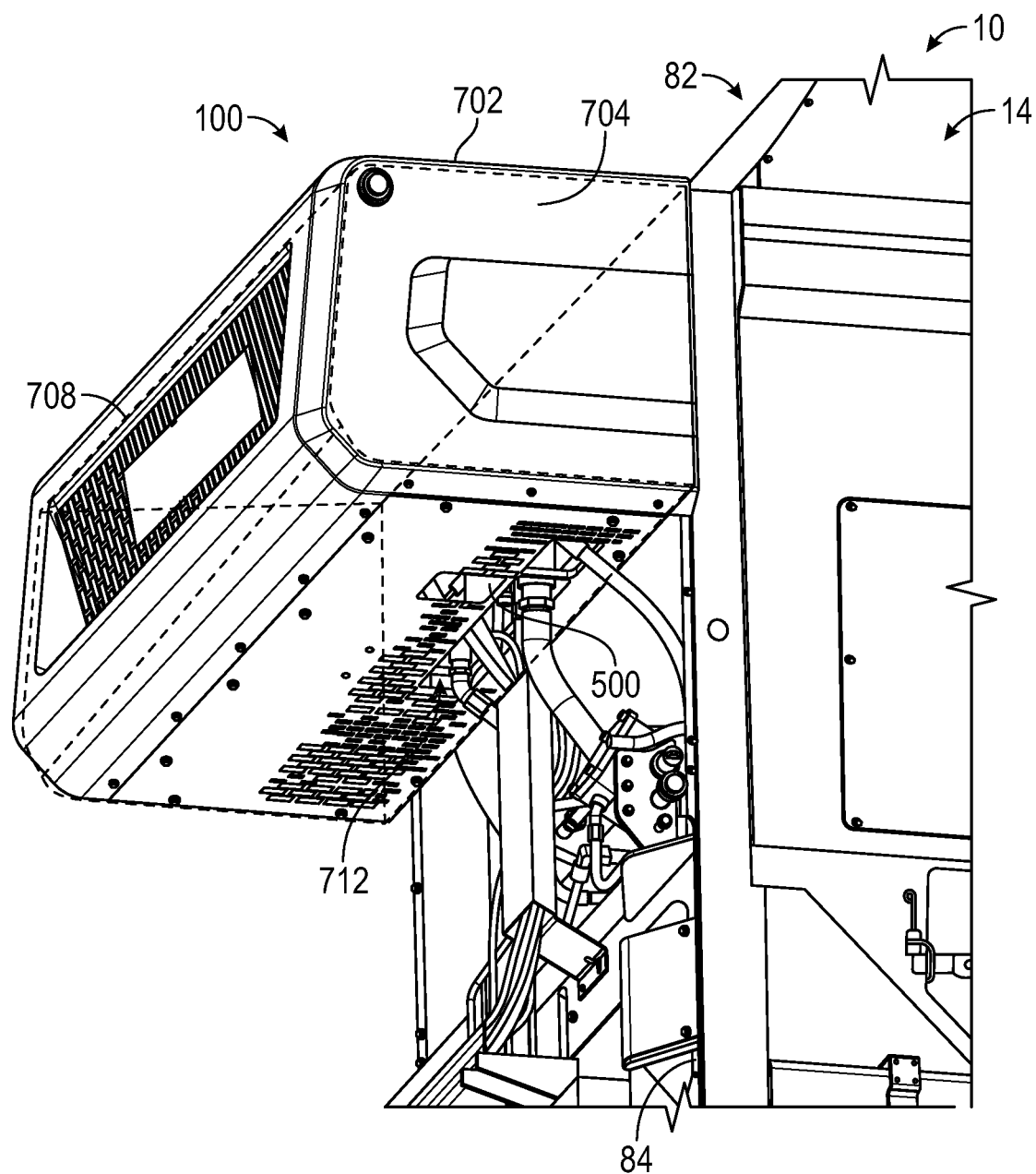
FIG. 8 is a perspective view of the modular E-PTO system of FIG. 7, according to an exemplary embodiment.
Figure 9:
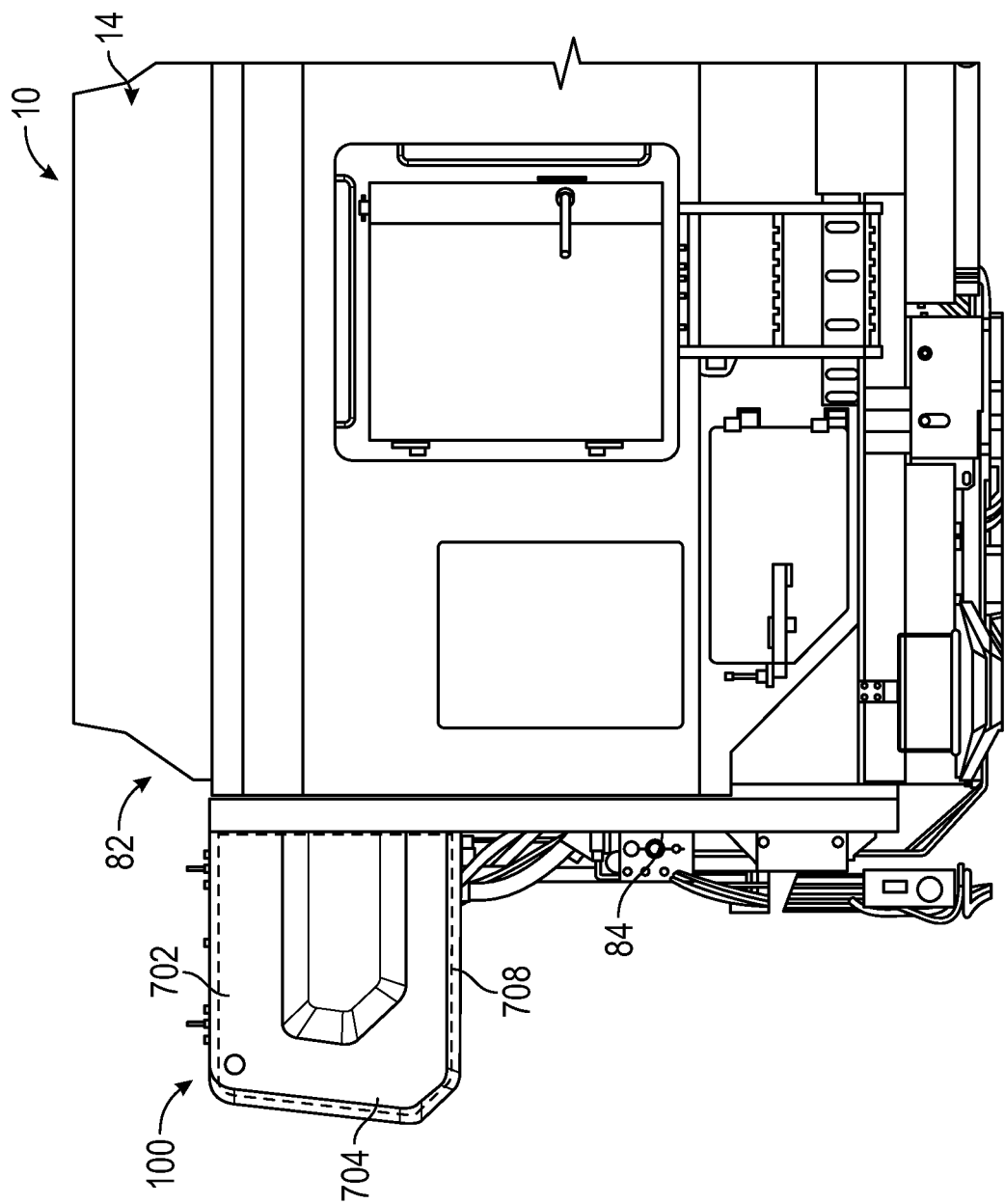
FIG. 9 is a side view of the modular E-PTO system of FIG. 7 installed on the refuse vehicle.
Figure 10:
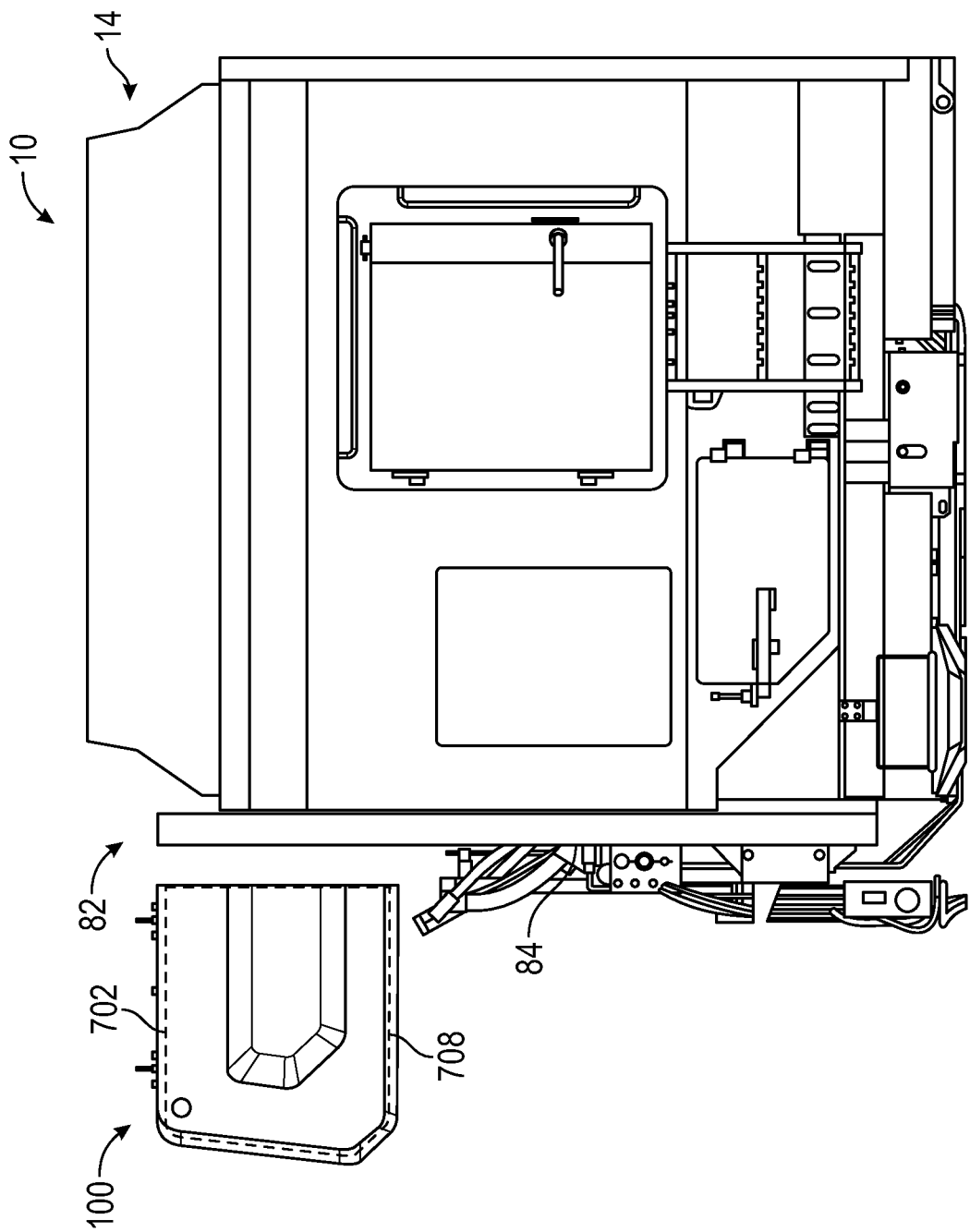
FIG. 10 is a side view of the modular E-PTO system of FIG. 7 removed from the refuse vehicle.
Figure 11:
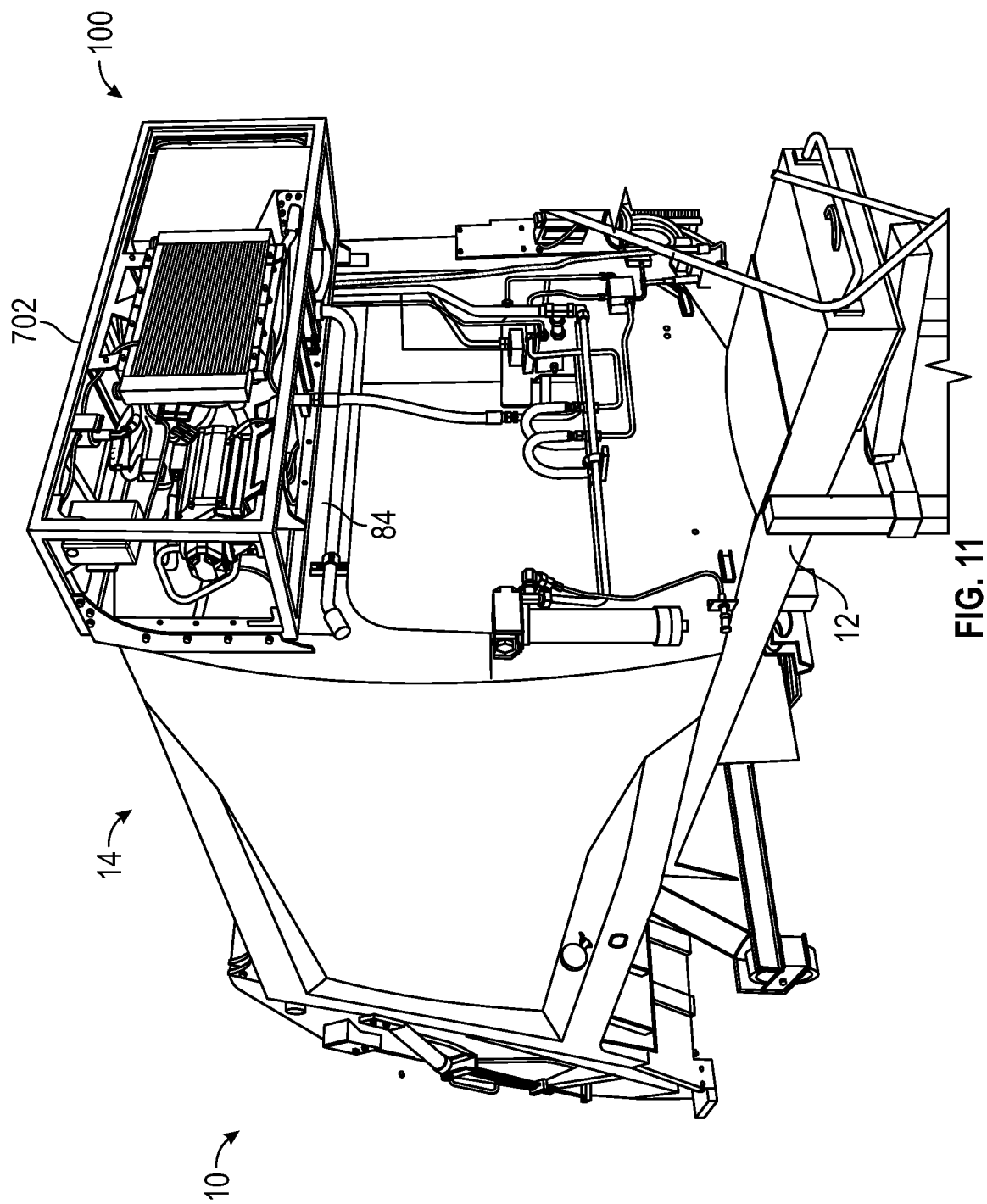
FIG. 11 is a perspective view of the modular E-PTO system of FIG. 7.

Referring particularly to FIG. 8, the modular E-PTO system 100 may include a junction box 500 that is coupled onto the modular housing 702 proximate a connection of the HV cables. In some embodiments, the junction box 500 facilitate safe and rapid disconnection or connection (e.g., electrical coupling or decoupling) of the HV cables such that components within the modular housing 702 can be electrically coupled with other HV components of the vehicle 10 (e.g., to receive HV power or electrical energy). Advantageously, the junction box 500 may provide a single point for electrical connection between the HV components of the modular E-PTO system 100 and the HV components of the vehicle 10, without requiring a technician to run wires to HV components of the E-PTO system 100 or disassemble portions of the housing 702.

Figure 13:
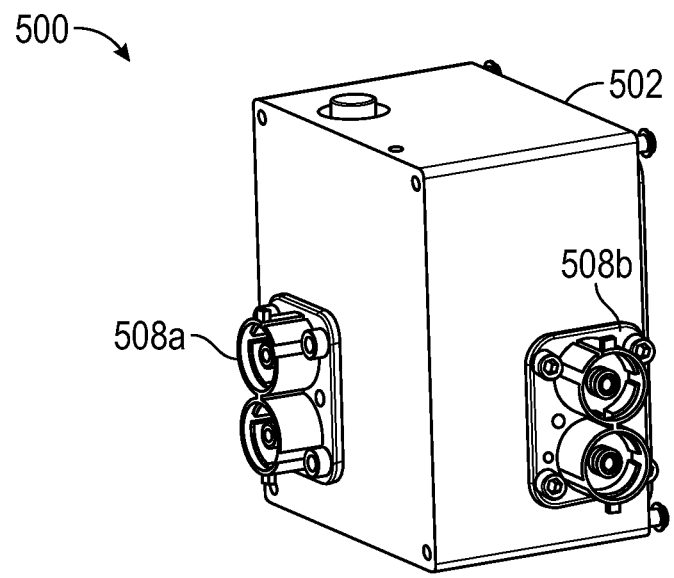
FIG. 13 is a perspective view of a junction box for a modular unit of a refuse vehicle, according to an exemplary embodiment.
Figure 14:
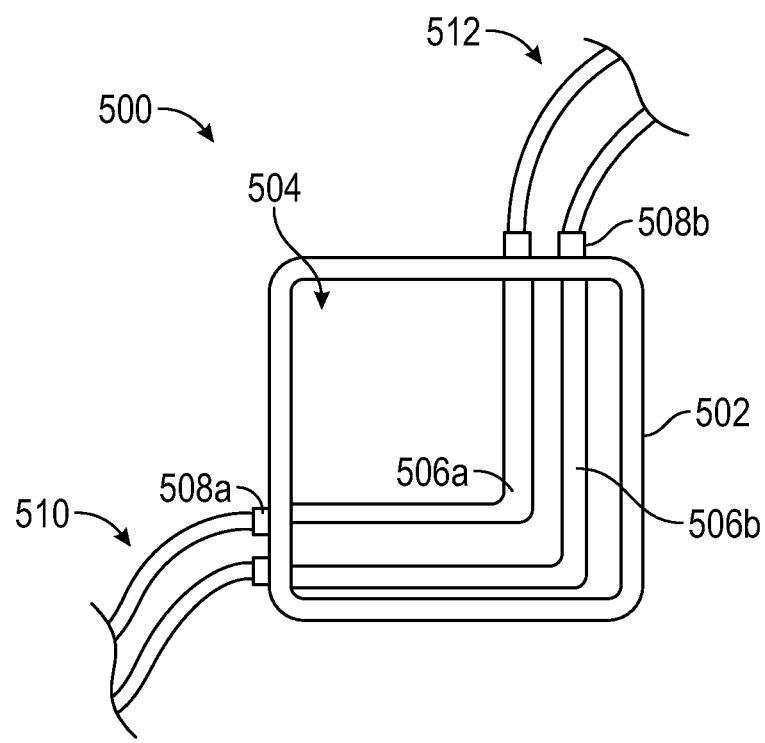
FIG. 14 is a side sectional view of the junction box of FIG. 13, according to an exemplary embodiment.

Referring particularly to FIGS. 13-14, the junction box 500 may include a housing 502 that defines an inner volume 504 within which HV cables 506 (e.g., HV cables 506a and 506b) are positioned. The HV cables 506 may form a 90 degree turn within the housing 502. In some embodiments, the HV cables 506 that are within the junction box 500 electrically couple with a first connector 508a and a second connector 508b. The first connector 508a and the second connector 508b are formed within sidewalls of the housing 502 and are configured to provide connection points for HV cables of the vehicle 10 and HV cables of the E-PTO system 100. In some embodiments, the first connector 508a and the second connector 508b are sealed connectors that seal with an exterior surface of HV cables (e.g., HV cables 512 that are routed into the modular housing 702 or HV cables 510 that are routed to and electrically couple with an HV system of the vehicle 10). In some embodiments, both the first connector 508a and the second connector 508b are insulated HV connectors. Advantageously, the junction box 500 may provide a space (e.g., the inner volume 504) within which a sub-assembly can be installed without removing components of the E-PTO system 100 to access internal HV connection points. The junction box 500 may be positioned and accessible from an exterior of the modular housing 702. The junction box 500 may be positioned within the inner volume 708 of the modular housing 702 as shown in FIG. 8 (and accessible to an operator via the opening 712), or may be positioned externally to the modular housing 702.

Figure 15:
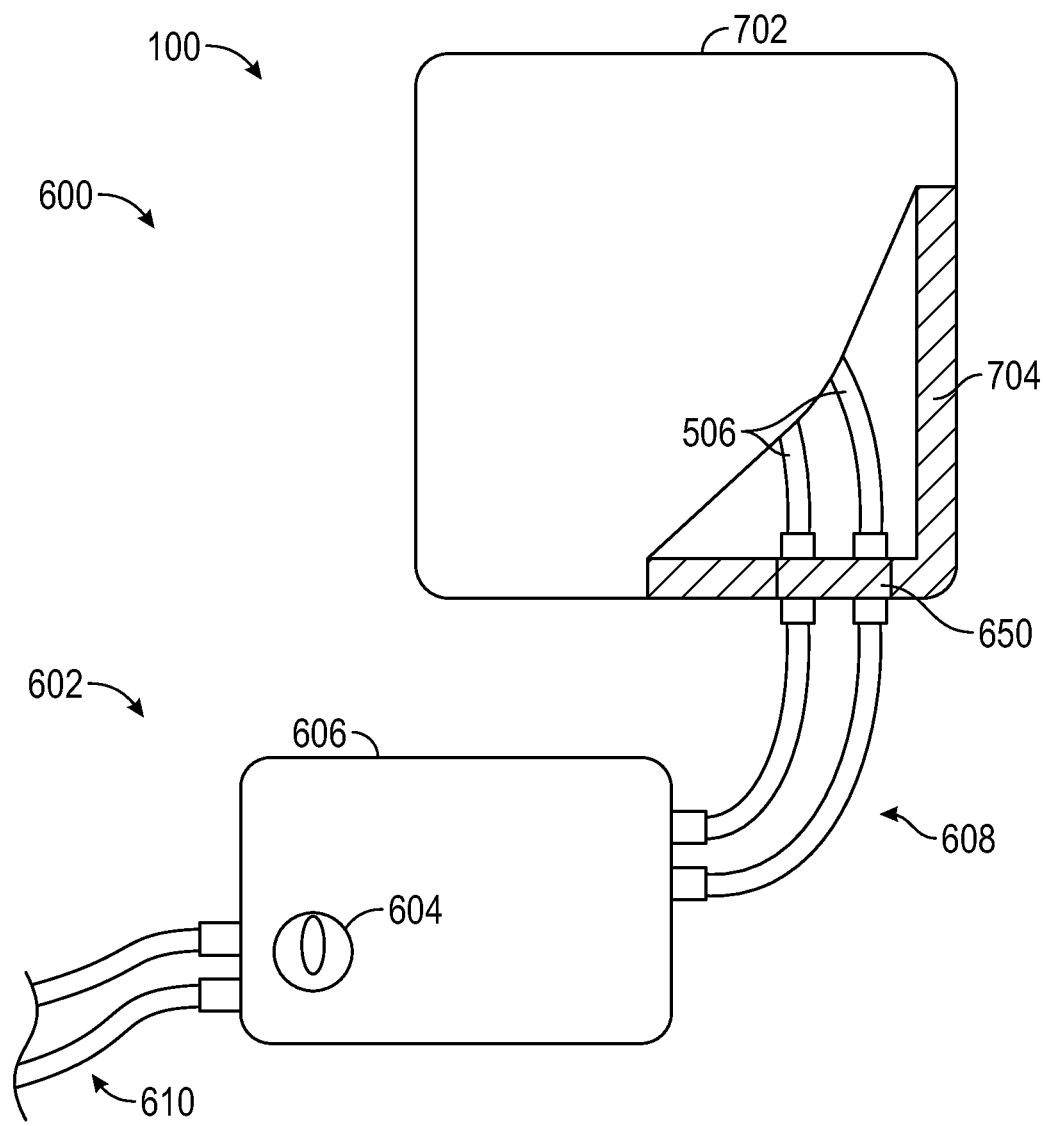
FIG. 15 is a diagram of a junction plate and disconnect box for a modular unit of a refuse vehicle, according to an exemplary embodiment.

Referring to FIG. 15, a disconnect system 600 for the modular E-PTO system 100 may include a junction plate 650 (e.g., a bulkhead) that is formed within the panels 704 of the housing 702. In some embodiments, the plate 650 is configured to receive and electrically couple with HV cables 608 that extend between the junction plate 650 and a disconnect box 602. In some embodiments, the disconnect box 602 includes a housing 606 that defines an inner volume within which a switch is positioned. The switch may be transitioned between an on state and an off state via a manual device 604 (e.g., a lever, a button, a switch, a toggle, etc.). In some embodiments, when the switch is transitioned into the off state, power or electrical energy does not flow through the HV cables 608 such that the HV cables 608 can be disconnected from the junction plate 650. Similarly, when the HV cables 608 are installed and electrically coupled with the junction plate 650 to thereby configure the modular E-PTO system 100 to exchange electrical energy with the HV components of the vehicle 10 (e.g., via the HV cables 608 and HV cables 610), the disconnect box 602 may be transitioned into the off state such that the HV cables 608 can be connected at the junction plate 650. Once the HV cables 608 are electrically coupled at the junction plate 650, the disconnect box 602 may be transitioned into the on state by actuation of the manual device 604 such that electrical energy can be exchanged between the HV components of the vehicle 10 and the HV components of the modular E-PTO system 100.

Figure 16:
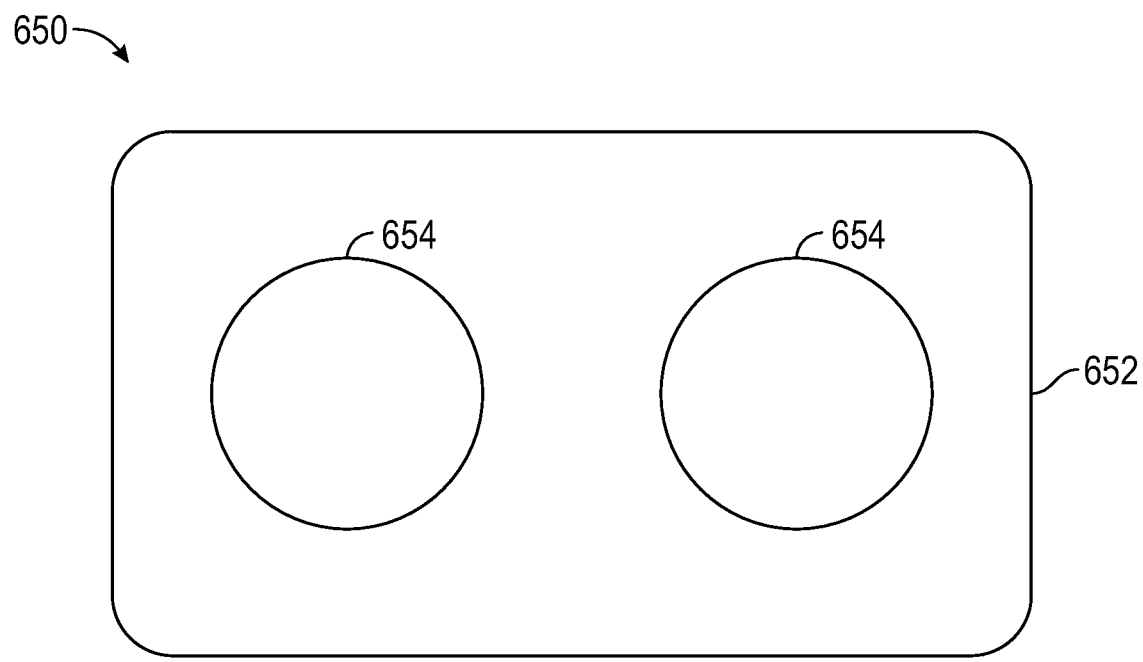
FIG. 16 is a front view of the junction plate of FIG. 15, according to an exemplary embodiment.
Figure 17:
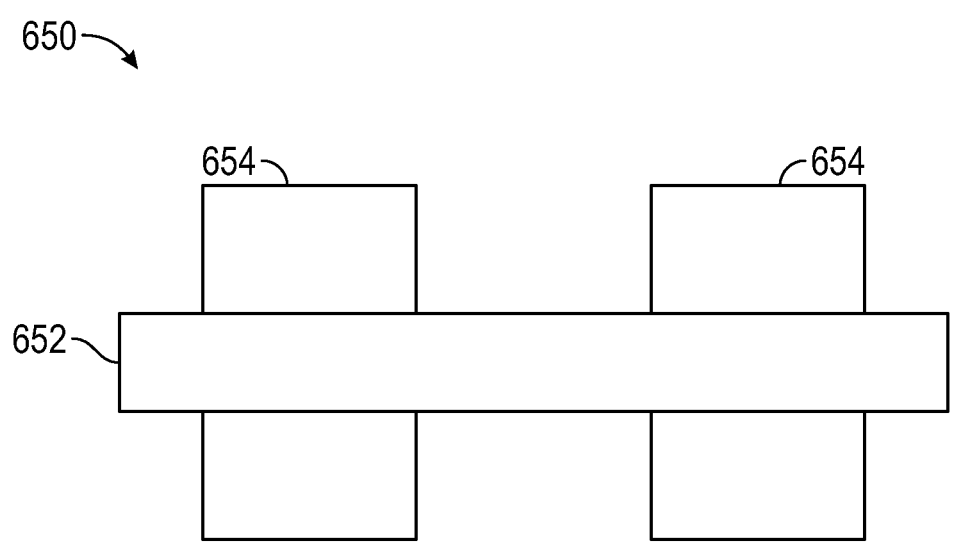
FIG. 17 is a side view of the junction plate of FIG. 15, according to an exemplary embodiment.

Referring to FIGS. 16-17, the junction plate 650 may include a plate member 652 and a pair of connectors 654 that are configured to electrically couple with one or more HV cables on either side. In some embodiments, both sides of the junction plate 650 are configured to receive insulated HV cables and include sealed connectors. Advantageously, the junction plate 650 can facilitate for a sub-assembly including HV cables or components (e.g., the E-PTO system 100) to be installed without removing components (e.g., housing members) of the modular housing 702 to access HV connection points within the sub-assembly. The junction plate 650 can advantageously provide a single point of electrical connection for HV cables that is accessible from an exterior of the sub-assembly, thereby facilitating modularity and integrity of the sub-assembly.

Figure 18:
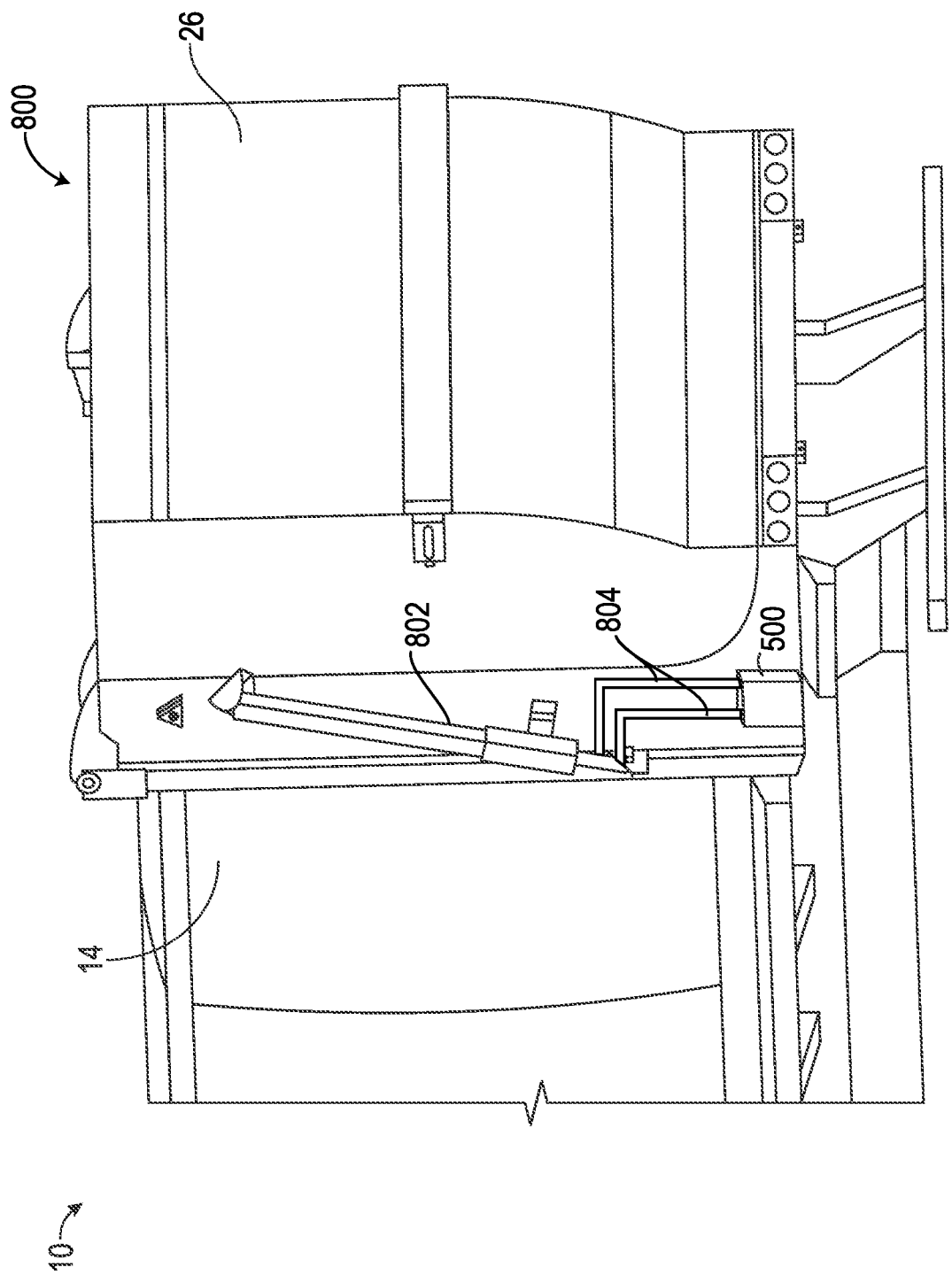
FIG. 18 is a perspective view of the junction box of FIG. 13 provided on a tailgate assembly, according to an exemplary embodiment.

Referring to FIG. 18, the disconnect system 600 or the junction box 500 may be provided on a modular tailgate assembly 800 that includes the tailgate 26 and one or more electric actuators 802. In some embodiments, the tailgate 26 is driven to rotate about a hinged coupling between the tailgate 26 and the body 14 by the electric actuators 802. The tailgate assembly 800 may similarly include one or more electric motors. In some embodiments, the tailgate assembly 800 includes the junction box 500 such that the junction box 500 provides a single point to electrically couple HV cables 804 and the electric actuators 802 with an HV electrical system of the vehicle 10 (e.g., batteries or an energy storage system of the vehicle 10 to provide power for the tailgate assembly 800). Advantageously, the tailgate assembly 800 may be provided as a modular assembly that is pre-assembled (e.g., off the body 14 of the vehicle 10), and fully wired (e.g., the HV cables 804 are wired to the junction box 500) such that the tailgate assembly 800 can be installed on the body 14 of the vehicle, and then easily electrically coupled with an HV system of the vehicle 10 such that the tailgate assembly 800 can receive power. In some embodiments, the tailgate assembly 800 includes the disconnect system 600 including the junction plate 650 and the disconnect box 602. Advantageously, the tailgate assembly 800 can be fully installed and electrically coupled onto the body 14 of the vehicle 10 without requiring a technician to run wires to any of the HV components of the tailgate assembly 800 (e.g., the electric actuators 802).

Although this description may discuss a specific order of method steps, the order of the steps may differ from what is outlined. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the electromechanical variable transmission as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A refuse vehicle comprising:
a chassis supporting a plurality of tractive elements;
a chassis battery supported by the chassis and configured to provide electrical power to a first motor, wherein rotation of the first motor selectively drives at least one of the plurality of tractive elements;
a vehicle body supported by the chassis and defining a receptacle for storing refuse therein; and
a modular electric power take-off ("E-PTO") system comprising a plurality of components positioned within a modular housing that is removably coupled with the vehicle body, the plurality of components of the modular E-PTO system comprising a motor, an inverter, a battery, and a hydraulic pump;
wherein a plurality of high voltage ("HV") components of the modular E-PTO system are electrically accessible to be electrically coupled with a HV electrical system of the refuse vehicle at a single connection point provided at a junction plate of the modular E-PTO system or at a junction box.

2. The refuse vehicle of claim 1, where the modular E-PTO system is removably coupled with a front of the receptacle or a hopper of the receptacle.

3. The refuse vehicle of claim 2, wherein the modular E-PTO system is fastened to a pair of brackets on a front of the hopper of the receptacle, the pair of brackets protruding from a front wall of the hopper at opposite lateral ends of the hopper.

4. The refuse vehicle of claim 1, wherein the motor of the modular E-PTO system is configured to consume electrical energy from the battery through the inverter and drive the hydraulic pump to provide pressurized hydraulic fluid to one or more hydraulic systems of the refuse vehicle to perform an operation.

5. The refuse vehicle of claim 1, wherein the modular E-PTO system is configured to be removed from the refuse vehicle as a unit by electrically de-coupling the HV components of the modular E-PTO system from the HV electrical system of the refuse vehicle at the single connection point, de-coupling one or more hydraulic lines, and removing the modular housing.

6. The refuse vehicle of claim 1, wherein the modular housing is proximate a cabin of the refuse vehicle, the cabin positioned forwards of the receptacle.

7. The refuse vehicle of claim 1, further comprising a switch electrically coupled with the single connection point, wherein the switch is transitionable between an on position such that the HV components of the modular E-PTO system exchange energy with the HV electrical system of the refuse vehicle, and an off position such that the HV components of the modular E-PTO system are limited from exchanging energy with the HV electrical system of the refuse vehicle for removal or installation of the modular E-PTO system.

8. The refuse vehicle of claim 1, wherein the junction plate is coupled with and defines part of a sidewall of the modular housing.

9. The refuse vehicle of claim 1, wherein the junction box is positioned within the modular housing and comprises a pair of connectors on different sides of the junction box and a pair of cables forming a 90 degree turn within the junction box and electrically coupling the pair of connectors on the different sides of the junction box.

10. A modular electric power take-off (E-PTO) system for a refuse vehicle, the modular E-PTO system comprising:
a modular housing; and
a motor, an inverter, a battery, and a hydraulic pump positioned within the modular housing;
wherein the modular housing is removably coupled with a front of a waste receptacle or a hopper of the waste receptacle of a refuse vehicle.

11. The modular E-PTO system of claim 10, wherein a plurality of high voltage ("HV") components of the modular E-PTO system are electrically accessible to be electrically coupled with a HV electrical system of the refuse vehicle at a single connection point provided at a junction plate of the modular E-PTO system or at a junction box.

12. The modular E-PTO system of claim 11, wherein the modular E-PTO system is configured to be removed from the refuse vehicle as a unit by electrically de-coupling the HV components of the modular E-PTO system from the HV electrical system of the refuse vehicle at the single connection point, de-coupling one or more hydraulic lines, and removing the modular housing.

13. The modular E-PTO system of claim 11, further comprising a switch electrically coupled with the single connection point, wherein the switch is transitionable between an on position such that the HV components of the modular E-PTO system exchange energy with the HV electrical system of the refuse vehicle, and an off position such that the HV components of the modular E-PTO system are limited from exchanging energy with the HV electrical system of the refuse vehicle for removal or installation of the modular E-PTO system.

14. The modular E-PTO system of claim 11, wherein the junction plate is coupled with and defines part of a sidewall of the modular housing.

15. The modular E-PTO system of claim 11, wherein the junction box is positioned within the modular housing and comprises a pair of connectors on different sides of the junction box and a pair of cables forming a 90 degree turn within the junction box and electrically coupling the pair of connectors on the different sides of the junction box.

16. The modular E-PTO system of claim 10, wherein the modular housing is fastened to a pair of brackets on a front of the hopper of the waste receptacle, the pair of brackets protruding from a front wall of the hopper at opposite lateral ends of the hopper.

17. The modular E-PTO system of claim 10, wherein the motor of the modular E-PTO system is configured to consume electrical energy from the battery through the inverter and drive the hydraulic pump to provide pressurized hydraulic fluid to one or more hydraulic systems of the refuse vehicle to perform an operation.

18. The modular E-PTO system of claim 10, wherein the modular housing is proximate a cabin of the refuse vehicle, the cabin positioned forwards of the waste receptacle.

19. A refuse vehicle comprising:
a chassis coupled with a plurality of wheels;
a chassis battery supported by the chassis and configured to provide electrical power to a first motor, wherein rotation of the first motor selectively drives at least one of the plurality of wheels;
a vehicle body supported by the chassis and defining a receptacle for storing refuse therein; and
a modular tailgate assembly comprising a tailgate pivotally coupled with the vehicle body, and a plurality of electric actuators;
wherein a plurality of high voltage ("HV") components of the modular tailgate assembly are electrically accessible to be electrically coupled with a HV electrical system of the refuse vehicle at a single connection point provided at a junction plate of the modular tailgate assembly or at a junction box.

20. The refuse vehicle of claim 19, wherein the modular tailgate assembly is electrically de-couplable at the single connection point from the HV electrical system of the refuse vehicle for physical removal of the modular tailgate assembly from the vehicle body.

* * * * *